US012558811B2

(12) United States Patent
Ambadi Omanakuttan Nair et al.

(10) Patent No.: US 12,558,811 B2
(45) Date of Patent: Feb. 24, 2026

(54) METHOD AND APPARATUS FOR MAKING A GYPSUM BOARD

(71) Applicant: KNAUF GIPS KG, Iphofen (DE)

(72) Inventors: Sooraj Kumar Ambadi Omanakuttan Nair, Evanston, IL (US); Mark K. Hemphill, Hawthorn Woods, IL (US); Yijun Sang, Oak Park, IL (US); Annamaria Vilinska, Chicago, IL (US)

(73) Assignee: KNAUF GIPS KG, Iphofen (DE)

( * ) Notice: Subject to any disclaimer, the term of this patent is extended or adjusted under 35 U.S.C. 154(b) by 316 days.

(21) Appl. No.: 18/349,597

(22) Filed: Jul. 10, 2023

(65) Prior Publication Data

US 2024/0033972 A1 Feb. 1, 2024

Related U.S. Application Data

(60) Provisional application No. 63/369,880, filed on Jul. 29, 2022.

(51) Int. Cl.
| | |
|---|---|
| *B28B 19/00* | (2006.01) |
| *C04B 28/14* | (2006.01) |
| *C04B 111/00* | (2006.01) |

(52) U.S. Cl.
CPC .......... *B28B 19/0092* (2013.01); *C04B 28/14* (2013.01); *C04B 2111/0062* (2013.01)

(58) Field of Classification Search
CPC ................ B28B 19/0092; C04B 28/14; C04B 2111/0062; C04B 2111/00413
See application file for complete search history.

(56) References Cited

U.S. PATENT DOCUMENTS

| | | | |
|---|---|---|---|
| 1,750,621 | A | 3/1930 | Brookby |
| 2,940,505 | A | 6/1960 | Brothers |
| 3,573,947 | A | 4/1971 | Kinkade et al. |
| 5,643,510 | A | 7/1997 | Sucech |
| 5,683,635 | A | 11/1997 | Sucech et al. |
| 5,714,032 | A | 2/1998 | Ainsley et al. |
| 5,908,521 | A | 6/1999 | Ainsley et al. |

(Continued)

FOREIGN PATENT DOCUMENTS

| | | |
|---|---|---|
| CN | 203947627 U | 11/2014 |
| CN | 206048906 U | 3/2017 |

(Continued)

OTHER PUBLICATIONS

Burrows, "A Decade's Experience of Gypsum Board Weight Reduction in the U.S.", 14. Internationale Baustofftagung (Weimar, Sep. 20-23, 2000), 1.0197-1.0207.

(Continued)

*Primary Examiner* — Christopher W Raimund
(74) *Attorney, Agent, or Firm* — Vorys, Sater, Seymour & Pease LLP; Pradip Sahu; Maryellen Feehery Hank

(57) ABSTRACT

A method and apparatus to manufacture gypsum board that directs a first portion of aqueous gypsum slurry to a front cover sheet, directs a second portion of aqueous gypsum slurry to a back cover sheet, passes the back cover sheet over a roller spaced above the front cover sheet so that a majority of the second aqueous gypsum slurry falls off the back cover sheet onto the first portion of aqueous gypsum slurry on the front cover sheet. A gypsum board made by the method or apparatus.

16 Claims, 10 Drawing Sheets

(56) References Cited

U.S. PATENT DOCUMENTS

| | | |
|---|---|---|
| 6,342,284 B1 | 1/2002 | Yu et al. |
| 6,409,825 B1 | 6/2002 | Yu et al. |
| 6,494,609 B1 | 12/2002 | Wittbold et al. |
| 6,632,550 B1 | 10/2003 | Yu et al. |
| 6,815,049 B2 | 11/2004 | Veeramasuneni et al. |
| 6,822,033 B2 | 11/2004 | Yu et al. |
| 6,874,930 B2 | 4/2005 | Wittbold et al. |
| 6,878,321 B2 | 4/2005 | Hauber et al. |
| 6,986,812 B2 | 1/2006 | Dubey et al. |
| 7,007,914 B2 | 3/2006 | Petersen et al. |
| 7,296,919 B2 | 11/2007 | Petersen et al. |
| 8,323,785 B2 | 12/2012 | Yu et al. |
| 8,770,139 B2 | 7/2014 | Frank et al. |
| 9,616,591 B2 | 4/2017 | Li et al. |
| 9,909,718 B2 | 3/2018 | Wittbold et al. |
| 9,999,989 B2 | 6/2018 | Rago et al. |
| 10,052,753 B2 | 8/2018 | Ni et al. |
| 10,052,793 B2 | 8/2018 | Li et al. |
| 10,076,853 B2 | 9/2018 | Wittbold et al. |
| 10,239,230 B2 | 3/2019 | Li et al. |
| 10,286,572 B2 | 5/2019 | Li et al. |
| 10,421,250 B2 | 9/2019 | Li et al. |
| 10,946,549 B2 | 3/2021 | Karakoussis et al. |
| 11,186,066 B2 | 11/2021 | Hemphill et al. |
| 2004/0134585 A1* | 7/2004 | Callais ............... B28B 19/0092 |
| | | 156/39 |
| 2012/0168527 A1 | 7/2012 | Li et al. |
| 2012/0207989 A1 | 8/2012 | Xu et al. |
| 2013/0098268 A1 | 4/2013 | Li et al. |
| 2018/0297233 A1 | 10/2018 | Karakoussis et al. |
| 2018/0305258 A1 | 10/2018 | Neil et al. |
| 2019/0352233 A1 | 11/2019 | Mlinska et al. |
| 2021/0129490 A1 | 5/2021 | Li et al. |
| 2021/0198148 A1 | 7/2021 | Li et al. |
| 2025/0018601 A1 | 1/2025 | Hemphill et al. |

FOREIGN PATENT DOCUMENTS

| | | |
|---|---|---|
| EP | 3152022 B1 | 8/2021 |
| JP | 2019147387 A | 9/2019 |
| WO | 2015185143 A1 | 12/2015 |
| WO | 2015185251 A1 | 12/2015 |

OTHER PUBLICATIONS

Peterson, Kurt, "Engineered Gypsum Panels, the Development and Application of Densified Zones at the Paper/Core Interface of Gypsum Panels", Proceedings of Gypsum 2000, 6th International Conference on Natural and Synthetic Gypsum, Toronto, Canada, May 2000, pp. 9-1-9-16.
International Search Report and Written Opinion of the International Searching Authority mailed Nov. 27, 2023 to United States Gypsum Company for International Application No. PCT/US2023/070831 filed Jul. 24, 2023.

* cited by examiner

METHOD AND APPARATUS FOR MAKING A GYPSUM BOARD

FIELD OF THE INVENTION

The present disclosure relates to methods for manufacturing gypsum boards and, more particularly, to methods and apparatus for distribution of an aqueous gypsum slurry for making gypsum boards.

BACKGROUND OF THE INVENTION

In the construction of buildings, one of the most common building elements is gypsum boards, also known as gypsum paneling, gypsum building panels, gypsum panels, or wallboard, used in the construction of walls and/or ceilings. Walls made from gypsum wallboard are traditionally constructed by affixing the panels to wood studs or metal framing, and treating the joints between adjoining panels with a specially prepared adhesive called a joint compound.

The gypsum board is primarily made of gypsum as opposed to cement boards which are primarily a cement, such as Portland cement. In particular, gypsum boards are primarily composed of calcium sulfate dihydrate. The gypsum boards are made by reacting water and stucco (also known as calcined gypsum) such that calcium sulfate hemihydrate sets to form calcium sulfate dihydrate (gypsum). Stucco is made by calcining gypsum, and it is typically comprised primarily of calcium sulfate hemihydrate and can also contain calcium sulfate anhydrite. The calcium sulfate hemihydrate is produced by calcination of calcium sulfate dihydrate to partially dehydrate the calcium sulfate dihydrate. When stucco is mixed with water, calcium sulfate hemihydrate particles react, rehydrating to become set gypsum.

It is well-known to produce the gypsum board by uniformly dispersing the calcined gypsum (stucco) in water to form an aqueous gypsum slurry (e.g., a mixture containing stucco and water). For purposes of this description the aqueous slurry that initially contains calcined gypsum which then sets to form gypsum is termed a gypsum slurry. The aqueous gypsum slurry is typically produced in a continuous manner by inserting stucco and water and optional other additives into a mixer which contains means for agitating the contents to form a uniform gypsum slurry. The additives may include, for example, retarders, accelerators, foaming agents, wet strength enhancing materials, biocides, sag resistant ingredients, cellulosic fibers, glass fibers, fire retarding materials, binders, water repellency ingredients, dust mitigators, starches, as well as other ingredients or enhancing materials that are known in the art.

The slurry is continuously directed towards and through a discharge outlet of the mixer and into a discharge conduit connected to the discharge outlet of the mixer. To reduce the overall weight of the finished gypsum board, air may be incorporated as bubbles or air pockets into the aqueous gypsum slurry resulting in a gypsum board having a foamed or bubbled gypsum core having air voids (also called air bubbles). For example, to provide the air, an aqueous foam can be combined with the aqueous gypsum slurry in the mixer and/or in the discharge conduit. The stream of slurry passes through the discharge conduit from which it is continuously deposited onto a moving web of cover sheet material, such as facer sheet of paper or fibrous mat, supported by a forming table. The slurry is allowed to spread over the advancing web.

A second web of cover sheet material, typically another facer sheet of paper or fibrous mat, is applied to cover the slurry and form a multi-layer structure of a continuous wallboard preform, such that the aqueous gypsum slurry, that will form the gypsum core, is between the two facing materials. The wallboard preform is subjected to forming, such as at a conventional forming station, to obtain a desired thickness. The calcined gypsum reacts with the water in the wallboard preform and sets (e.g., to form an interlocking matrix of calcium sulfate dihydrate, referred to as set gypsum) as the wallboard preform moves down a manufacturing line. The wallboard preform is cut into segments at a point along the line where the wallboard preform has set sufficiently, the segments are flipped over, dried (e.g., in a kiln) to drive off excess water, and processed to provide the final wallboard product of desired dimensions. The produced gypsum board may be further processed, as is known in the art, and then bundled, and made ready for shipment.

U.S. Pat. No. 10,421,250 to Li et al discloses a composite board comprising a board core and a concentrated layer of substantial thickness. The concentrated layer has a higher density than the board core.

US 2012/0207989 to Xu et al discloses multilayered core cementitious boards with increased nail-pull resistance. The boards can include two or more layers of cementitious compositions, wherein each layer may be of a different density.

Prior devices and methods for addressing some of the operational problems associated with the production of gypsum wallboard are disclosed in U.S. Pat. Nos. 5,683,635; 5,643,510; 6,494,609; 6,874,930; 7,007,914; and 7,296,919; 9,999,989 to Rago et al., U.S. Pat. No. 10,076,853 to Wittbold et al.; U.S. Pat. No. 9,909,718 to Wittbold et al.; U.S. Pat. No. 10,286,572 to Li et al.; U.S. Pat. No. 10,052,753 to Li et al.; U.S. Pat. No. 10,239,230 to Li et al.; U.S. Pat. No. 9,616,591 to Li et al. Other prior devices and methods for addressing some of the operational problems associated with the production of gypsum wallboard are disclosed in WO2015185251-A1 to Martin et al and WO2015185143-A1 to Martin et al.

A conventional manufacturing line directs the core slurry (through a hose towards a densified layer on the face paper. This process may remove some of densified layer on the face paper at the point of impact. For purposes of this specification, such removal is termed washout.

SUMMARY OF THE INVENTION

The present invention provides a method and apparatus to manufacture gypsum board that directs a first portion of aqueous gypsum slurry to a front cover sheet, directs a second portion of aqueous gypsum slurry to a back cover sheet, passes the back cover sheet over a roller spaced above the front cover sheet so that a majority of the second aqueous gypsum slurry falls off the back cover sheet onto the first portion of aqueous gypsum slurry on the front cover sheet.

The present invention provides a method to manufacture gypsum board comprising:

depositing a front cover sheet having first and second opposed surfaces over a forming surface, the front cover sheet first surface being a lower surface facing the forming surface and the front cover sheet second surface being an upper surface facing away from the forming surface, and moving the front cover sheet horizontally in a machine direction along the forming surface;

depositing a first portion of aqueous gypsum slurry over the front cover sheet to form a layer of the first portion of aqueous gypsum slurry as a higher-density region in layer form contacting the upper surface of the front cover sheet, moving a back cover sheet having third and fourth opposed surfaces along a back cover sheet path comprising a first path segment and a second path segment downstream of the first path segment, wherein the back cover sheet moves along the first path segment above the higher-density region on the front cover sheet with movement comprising a first vertical movement component and/or a first horizontal movement component, wherein the first vertical movement component being movement in a direction downwards towards the higher-density region on the front cover sheet, wherein the first horizontal movement component being movement in a direction opposite to the machine direction, depositing a second portion of aqueous gypsum slurry, which is less dense than the first portion of aqueous gypsum slurry, to contact the third surface of the back cover sheet in the first path segment, wherein the second portion of aqueous gypsum slurry contacts the back cover sheet at an angle of incidence "B" of 0 to 90 degrees, for example 0 to 20 degrees, preferably 5 to 90 degrees, furthermore preferably 5 to 85 degrees or 5 to 60 degrees relative to the surface of the back cover sheet contacted by the slurry, wherein the first portion of aqueous slurry and the second portion of aqueous slurry each comprise a respective mixture of water and stucco, wherein the stucco comprises calcium sulfate hemihydrate, wherein the first portion of aqueous slurry and the second portion of aqueous slurry each comprise a respective mixture of at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and the water at a weight ratio of water to the calcium sulfate hemihydrate of 0.2:1 to 1.2:1;

then at a downstream end of the first path segment passing the back cover sheet with the second portion of aqueous gypsum slurry over a first transition roller spaced a distance above the higher-density region on the front cover sheet, while the fourth surface of the back cover sheet contacts the first transition roller, to deposit a majority by weight of the second portion of aqueous gypsum slurry that dropped away from the back cover sheet on the higher-density region on the front cover sheet, to form a layer of the second portion of aqueous gypsum slurry in a foamed state as a lower-density region in layer form contacting an upper surface of the higher density region, the higher-density region having a higher density than the lower-density region;

the back cover sheet then passes around the first transition roller to feed the back cover sheet to the second path segment, wherein the second path segment has an upstream end and a downstream end, the upstream end at the first transition roller, wherein typically as the deposition of the second aqueous gypsum slurry occurs a remainder of the second aqueous gypsum slurry remains in contact with the back cover sheet as the back cover sheet moves into the second path segment, and at the downstream end of the second path segment depositing the back cover sheet on the second portion of the aqueous gypsum slurry on the face cover sheet to form a multilayer assembly including the back cover sheet on the second portion of the aqueous gypsum slurry, typically the multilayer assembly includes the first portion of aqueous gypsum slurry layer on the front cover sheet, the second portion of aqueous gypsum slurry layer on the first portion of aqueous gypsum slurry layer, and the back cover sheet on the second portion of aqueous gypsum slurry layer;

passing the multilayer assembly into a forming station for forming the multilayer assembly, wherein preferably the multilayer assembly passes under a forming plate of the forming station;

setting the calcium sulfate hemihydrate of the respective first portion of aqueous gypsum slurry layer and second portion of aqueous gypsum slurry layer by reacting the calcium sulfate hemihydrate with the water of the respective first portion of aqueous slurry layer and the second portion of aqueous gypsum slurry layer to form a panel comprising a gypsum core of respective first and second board layers comprising calcium sulfate dihydrate between the front cover sheet and the back cover sheet, wherein the first board layer comprises a set higher-density region as a layer comprising calcium sulfate dihydrate and has a first board layer density, wherein the second board layer comprises a set lower-density region as a layer comprising calcium sulfate dihydrate and has a second board layer density lower than the first board layer density, the set higher-density region being interposed between the set lower-density region and the front cover sheet; and drying the panel and cutting the panel into the gypsum board.

Preferably the back cover sheet moves along a downstream portion of the first path segment with movement along a slope defining an angle "A" between the back cover sheet in the downstream portion of the first path segment and the front cover sheet on the forming surface of 0 to 90 degrees, typically the angle "A" is 5 to 90 degrees or 5 to 85 degrees, more typically the angle "A" is 0 to 20 degrees or 20 to 60 degrees, by having the first vertical movement component and the first horizontal movement component both simultaneously present along all or a same portion of the first segment.

Typically the discharge of the second portion of aqueous gypsum slurry is in a direction of counter current flow with direction of movement of the back cover sheet. Or typically the discharge of the second portion of aqueous gypsum slurry is in a direction of concurrent flow with the direction of movement of the back cover sheet.

Preferably the first transition roller changes the direction of movement of the back cover sheet to movement along a first portion of the second path segment that has a second horizontal movement component in the machine direction and a second vertical movement component, the second vertical movement component being upwards, or downwards, or neutral to provide movement only along the second horizontal movement component. Typically the second vertical movement component is movement in a direction upwards away from the higher-density region on the front cover sheet.

Preferably the first transition roller is a freewheeling roller;

Typically the second path segment has a first portion and a second portion, wherein at a downstream end of the first portion of the second path segment the back cover sheet passes over a second transition roller to feed the back cover sheet to the second portion of the second path segment and change the direction of movement of the back cover sheet.

Typically at the downstream end of the second path segment the method deposits the back cover sheet on the second portion of aqueous gypsum slurry on the front cover sheet to form the multilayer assembly to include the front cover sheet, the back cover sheet and the second portion of the aqueous gypsum slurry, most typically the multilayer assembly includes the first portion of aqueous gypsum slurry layer on the front cover sheet, the second portion of aqueous gypsum slurry layer on the first portion of aqueous gypsum slurry layer, and the back cover sheet on the second portion of aqueous gypsum slurry layer.

The present invention provides a method to manufacture gypsum board comprising:

preparing an aqueous gypsum slurry comprising a mixture of water and stucco, wherein the stucco comprises calcium sulfate hemihydrate, wherein the aqueous gypsum slurry comprises a mixture of:

at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and the water at a weight ratio of water to the calcium sulfate hemihydrate of 0.2:1 to 1.2:1; and depositing a front cover sheet over a forming surface and moving the front cover sheet horizontally in a machine direction along the forming surface;

depositing a first portion of the aqueous gypsum slurry over the front cover sheet to form a layer of the first portion of the aqueous gypsum slurry as a higher-density region in layer form contacting an upper surface of the front cover sheet, moving a back cover sheet along a back cover sheet path comprising a first path segment and a second path segment, wherein the back cover sheet moves along the first path segment above the higher-density region on the front cover sheet with movement comprising a first vertical movement component and/or a first horizontal movement component, wherein the first vertical movement component being movement in a direction downwards towards the higher-density region on the front cover sheet, wherein the first horizontal movement component being movement in a direction opposite to the machine direction, preferably the back cover sheet moves along a downstream portion of the first path segment with movement along a slope defining an angle "A" between the back cover sheet in the downstream portion of the first path segment and the front cover sheet on the forming surface of 0 to 90 degrees, typically the angle "A" is 0 to 90 degrees, more typically the angle "A" is 5 to 90 degrees or 5 to 85 degrees, more typically the angle "A" is 0 to 20 degrees or 20 to 60 degrees by having the first vertical movement component and the first horizontal movement component both simultaneously present along all or a same portion of the first segment;

wherein a slurry mixer discharges a second portion of the aqueous gypsum slurry, which is less dense than the first portion of the aqueous gypsum slurry, to contact a surface of the back cover sheet in the first path segment, wherein the slurry contacts the back paper at an angle of incidence "B" of 0 to 90 degrees, for example 0 to 20 degrees, preferably 5 to 90 degrees, furthermore preferably 5 to 85 degrees, furthermore preferably 5 to

6

60 degrees relative to the surface of the back cover sheet contacted by the slurry, typically the discharge of calcined gypsum core slurry is in a direction of counter current flow with direction of movement of the back cover sheet, or typically the discharge of calcined gypsum core slurry may be in a direction of concurrent flow with the direction of movement of the back cover sheet;

at a downstream end of the first path segment the back cover sheet then passes around a first transition roller to feed the back cover sheet to the second path segment, wherein the second path segment has an upstream end and a downstream end, the upstream end at the first transition roller, preferably the first transition roller changes the direction of movement of the back cover sheet to movement along a first portion of the second path segment that has a second horizontal movement component in the machine direction and a second vertical movement component, the second vertical movement component being upwards, or downwards, or neutral to provide movement only along the second horizontal movement component, typically the second vertical movement component is movement in a direction upwards away from the higher-density region on the front cover sheet;

wherein the first transition roller is spaced a distance above the higher-density region on the front cover sheet, passing the second portion of the aqueous gypsum slurry over the first transition roller to deposit a majority by weight of the second portion of the aqueous gypsum slurry on the higher-density region on the front cover sheet, wherein typically as this deposition occurs a remainder of the second portion of the aqueous gypsum slurry remains in contact with the back cover sheet as the back cover sheet moves into the second path segment, wherein preferably the first transition roller is a free-wheeling roller;

typically the second path segment has a first portion and a second portion, wherein at a downstream end of the first portion of the second path segment the back cover sheet passes over a second transition roller to feed the back cover sheet to the second portion of the second path segment and change the direction of movement of the back cover sheet;

at the downstream end of the second path segment depositing the back cover sheet on the second portion of the aqueous gypsum slurry on the face cover sheet to form a multilayer assembly including the back cover sheet on the second portion of the aqueous gypsum slurry, typically the multilayer assembly includes the first portion of aqueous gypsum slurry layer on the front cover sheet, the second portion of aqueous gypsum slurry layer on the first portion of aqueous gypsum slurry layer, and the back cover sheet on the second portion of aqueous gypsum slurry layer;

passing the multilayer assembly into a forming station for forming the multilayer assembly, wherein preferably the multilayer assembly passes under a forming plate of the forming station;

setting the calcium sulfate hemihydrate to form a panel comprising a gypsum core comprising calcium sulfate dihydrate; and drying the panel and cutting the panel into a gypsum board having one or more pre-determined dimensions, wherein the first portion of the gypsum slurry forms a higher-density region in layer form contacting the front cover sheet;

wherein the second portion of the gypsum slurry is in a foamed state as a lower-density region contacting the higher-density region, the higher-density region having a higher density than the lower-density region; and wherein the board core comprises a set lower-density region comprising calcium sulfate dihydrate and a set higher-density region comprising calcium sulfate dihydrate, the set higher-density region being interposed as a layer between the set lower-density region and the front cover sheet.

The present invention also provides an apparatus to manufacture gypsum board comprising:

a forming surface for depositing thereon a front cover sheet and moving the front cover sheet horizontally in a machine direction along the forming surface, a source of a first portion of the aqueous gypsum slurry in an unfoamed state for depositing the first portion of the aqueous gypsum slurry over the front cover sheet to form a layer of the aqueous gypsum slurry as a higher-density region in layer form contacting an upper surface of the front cover sheet, wherein the first aqueous gypsum slurry layer has a first slurry density, a back cover sheet drive comprising a first transition roller, and typically a second transition roller, for moving a back cover sheet along a back cover sheet path comprising a first path segment and a second path segment, wherein the first path segment is adapted and configured for moving the back cover sheet along the first path segment above the higher-density region on the front cover sheet with movement comprising a first vertical movement component and/or a first horizontal movement component, wherein the first vertical movement component being movement in a direction downwards towards the higher-density region on the front cover sheet, wherein the first horizontal movement component being movement in a direction opposite to the machine direction, a source of a second portion of the aqueous gypsum slurry, which is less dense than the first portion of the aqueous gypsum slurry, to contact a surface of the back cover sheet in the first path segment, wherein the second portion of the aqueous gypsum slurry contacts the back cover sheet at an angle of incidence "B" of 0 to 90 degrees, for example 0 to 20 degrees, preferably 5 to 90 degrees, furthermore preferably 5 to 85 degrees, furthermore preferably 5 to 60 degrees relative to the surface of the back cover sheet contacted by the second portion of the aqueous gypsum slurry, the first transition roller at a downstream end of the first path segment for passing the back cover sheet around the first transition roller to feed the back cover sheet to the second path segment, wherein the second path segment has an upstream end and a downstream end, wherein the second path segment upstream end is at the first transition roller, the first transition roller is spaced a distance above the higher-density region on the front cover sheet for passing the second portion of the aqueous gypsum slurry over the first transition roller to deposit a majority by weight of the second portion of the aqueous gypsum slurry that dropped away from the back cover sheet on the higher-density region on the front cover sheet, wherein typically as this deposition occurs a remainder of the second portion of the aqueous gypsum slurry remains in contact with the back cover sheet as the back cover sheet moves into the second path segment, wherein the first portion of aqueous gypsum slurry and second portion of aqueous gypsum slurry comprise a respective mixture of water and stucco, wherein the stucco comprises calcium sulfate hemihydrate, wherein the first portion of aqueous gypsum slurry and second portion of aqueous gypsum slurry respectively comprise a mixture of at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and the water at a weight ratio of water to the calcium sulfate hemihydrate of 0.2:1 to 1.2:1; and the downstream end of the second path segment located for depositing the back cover sheet on the second portion of the aqueous gypsum slurry on the front cover sheet to form a multilayer assembly including the back cover sheet on the second portion of the aqueous gypsum slurry, preferably including the back cover sheet on the second portion of the aqueous gypsum slurry, preferably including the front cover sheet, the first portion of aqueous gypsum slurry layer on the front cover sheet, the second portion of aqueous gypsum slurry layer on the first portion of aqueous gypsum slurry layer, and the back cover sheet on the second portion of aqueous gypsum slurry layer;

a forming station for forming the multilayer assembly, preferably the forming station comprises a forming plate;

setting the calcium sulfate hemihydrate to form a panel comprising a gypsum core comprising calcium sulfate dihydrate; and wherein the first portion of the gypsum slurry is forms a higher-density region in layer form contacting the front cover sheet;

wherein the second portion of the gypsum slurry is in a foamed state as a lower-density region contacting the higher-density region, the higher-density region having a higher density than the lower-density region; and wherein the board core comprises a set lower-density region comprising calcium sulfate dihydrate and a set higher-density region comprising calcium sulfate dihydrate, the set higher-density region being interposed as a layer between the set lower-density region and the front cover sheet.

Typically the apparatus comprises a mixer for preparing an aqueous gypsum slurry for the first portion of aqueous gypsum slurry comprising a mixture of water, and stucco, wherein the stucco comprises calcium sulfate hemihydrate, wherein the aqueous gypsum slurry comprises a mixture of: at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and the water at a weight ratio of water to the calcium sulfate hemihydrate of 0.2:1 to 1.2:1.

Preferably the back cover sheet moves along a downstream portion of the first path segment with movement along a slope defining an angle "A" between the back cover sheet in the downstream portion of the first path segment and the front cover sheet on the forming surface of 0 to 90 degrees, typically the angle "A" is 0 to 90 degrees, more typically the angle "A" is 5 to 90 degrees or 5 to 85 degrees, more typically the angle "A" is 20 to 60 degrees by having the first vertical movement component and the first horizontal movement component both simultaneously present along all or a same portion of the first segment.

Typically the discharge of calcined gypsum core slurry is in a direction of counter current flow with direction of movement of the back cover sheet, or typically the discharge of calcined gypsum core slurry may be in a direction of concurrent flow with the direction of movement of the back cover sheet.

Preferably the first transition roller changes the direction of movement of the back cover sheet to movement along a first portion of the second path segment that has a second horizontal movement component in the machine direction and a second vertical movement component, the second vertical movement component being upwards, or downwards, or neutral to provide movement only along the second horizontal movement component, typically the second vertical movement component is movement in a direction upwards away from the higher-density region on the front cover sheet.

Preferably the first transition roller is a freewheeling roller.

Typically the second path segment has a first portion and a second portion, wherein at a downstream end of the first portion of the second path segment the back cover sheet passes over a second transition roller to feed the back cover sheet to the second portion of the second path segment and change the direction of movement of the back cover sheet.

The present invention also provides an apparatus to manufacture gypsum board comprising:

a mixer for preparing an aqueous gypsum slurry comprising a mixture of water, and stucco, wherein the stucco comprises calcium sulfate hemihydrate, wherein the aqueous gypsum slurry comprises a mixture of:

at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and the water at a weight ratio of water to the calcium sulfate hemihydrate of 0.2:1 to 1.2:1; and a forming surface for depositing thereon a front cover sheet and moving the front cover sheet horizontally in a machine direction along the forming surface;

a source of a first portion of the aqueous gypsum slurry in an unfoamed state for depositing the first portion of the aqueous gypsum slurry over the front cover sheet to form a layer of the aqueous gypsum slurry as a higher-density region in layer form contacting an upper surface of the front cover sheet, a back cover sheet drive comprising a first transition roller and a second transition roller for moving a back cover sheet along a back cover sheet path comprising a first path segment and a second path segment, wherein the first path segment is adapted and configured for moving the back cover sheet along the first path segment above the higher-density region on the front cover sheet with movement comprising a first vertical movement component and/or a first horizontal movement component, wherein the first vertical movement component being movement in a direction downwards towards the higher-density region on the front cover sheet, wherein the first horizontal movement component being movement in a direction opposite to the machine direction,

preferably the back cover sheet moves along a downstream portion of the first path segment with movement along a slope defining an angle "A" between the back cover sheet in the downstream portion of the first path segment and the front cover sheet on the forming surface of 0 to 90 degrees, typically the angle "A" is 0 to 90 degrees, more typically the angle "A" is 5 to 90 degrees or 5 to 85 degrees, more typically the angle "A" is 20 to 60 degrees by having the first vertical movement component and the first horizontal movement component both simultaneously present along all or a same portion of the first segment;

a second portion of the aqueous gypsum slurry, which is less dense than the first portion of the aqueous gypsum slurry, to contact a surface of the back cover sheet in the first path segment, wherein the slurry contacts the back paper at an angle of incidence "B" of 0 to 90 degrees, for example 0 to 20 degrees, preferably 5 to 90 degrees, furthermore preferably 5 to 85 degrees, furthermore preferably 5 to 60 degrees relative to the surface of the back cover sheet contacted by the slurry, typically the discharge of calcined gypsum core slurry is in a direction of counter current flow with direction of movement of the back cover sheet, or typically the discharge of calcined gypsum core slurry may be in a direction of concurrent flow with the direction of movement of the back cover sheet;

the first transition roller at a downstream end of the first path segment for passing the back cover sheet around the first transition to feed the back cover sheet to the second path segment, wherein the second path segment has an upstream end and a downstream end, wherein the upstream end is at the first transition roller, preferably the first transition roller changes the direction of movement of the back cover sheet to movement along a first portion of the second path segment that has a second horizontal movement component in the machine direction and a second vertical movement component, the second vertical movement component being upwards, or downwards, or neutral to provide movement only along the second horizontal movement component, typically the second vertical movement component is movement in a direction upwards away from the higher-density region on the front cover sheet;

the first transition roller is spaced a distance above the higher-density region on the front cover sheet for passing the second portion of the aqueous gypsum slurry over the first transition roller to deposit a majority by weight of the second portion of the aqueous gypsum slurry on the higher-density region on the front cover sheet, wherein typically as this deposition occurs a remainder of the second portion of the aqueous gypsum slurry remains in contact with the back cover sheet as the back cover sheet moves into the second path segment, wherein preferably the first transition roller is a freewheeling roller;

typically the second path segment has a first portion and a second portion, wherein at a downstream end of the first portion of the second path segment the back cover sheet passes over a second transition roller to feed the back cover sheet to the second portion of the second path segment and change the direction of movement of the back cover sheet;

the downstream end of the second path segment located for depositing the back cover sheet on the second portion of the aqueous gypsum slurry on the front cover sheet to form a multilayer assembly including the back cover sheet on the second portion of the aqueous gypsum slurry, preferably including the back cover sheet on the second portion of the aqueous gypsum slurry, preferably including the front cover sheet, the first portion of aqueous gypsum slurry layer on the front cover sheet, the second portion of aqueous gypsum slurry layer on the first portion of aqueous gypsum slurry layer, and the back cover sheet on the second portion of aqueous gypsum slurry layer;

a forming station for forming the multilayer assembly, preferably the forming station comprises a forming plate;

setting the calcium sulfate hemihydrate to form a panel comprising a gypsum core comprising calcium sulfate dihydrate; and wherein the first portion of the gypsum slurry is forms a higher-density region in layer form contacting the front cover sheet;

wherein the second portion of the gypsum slurry is in a foamed state as a lower-density region contacting the higher-density region, the higher-density region having a higher density than the lower-density region; and wherein the board core comprises a set lower-density region comprising calcium sulfate dihydrate and a set higher-density region comprising calcium sulfate dihydrate, the set higher-density region being interposed as a layer between the set lower-density region and the front cover sheet.

The present invention also provides a gypsum board made according to the method or by the apparatus of the present invention.

BRIEF DESCRIPTION OF THE DRAWINGS

Like reference numerals in the figures indicate like elements unless otherwise indicated.

DETAILED DESCRIPTION OF THE INVENTION

The present invention comprises methods and apparatus that orient a back paper drive to direct core slurry deposition and distribution on the back paper, and subsequently drop from the back paper onto a dense layer on a face paper in a gypsum board manufacturing line to form a core layer, and then apply the back paper onto the core layer.

The initial plane of contact of the core-slurry with the back paper, rather than the denser layer slurry on the face paper, avoids the significant contact forces and hydraulic jump that may occur if the core-slurry was directly applied from the mixer onto the denser layer. Such significant contact forces and hydraulic jump can move the denser layer out of position causing washout.

The proposed invention helps avoid washout of the denser layer on the face paper by not depositing the core layer slurry directly from the mixer onto the denser layer on the face paper. This helps to avoid an otherwise uneven cross-sectional gypsum distribution, improving the gypsum density distribution, nail pull test results, and overall compliance of properties of the board.

One of skill in the art would be able to modify the methods described herein to produce interior wallboard having a gypsum core between paper facer sheets, exterior sheathing and roofing gypsum panels, gypsum tile backer board, or other gypsum building panels. A typical gypsum panel produced according to the invention comprises, from front to back, a first fibrous mat, a gypsum core layer having front and rear surfaces, the gypsum core layer having a thickness of about 0.25 inches to about 1.6 inches, typically about 0.25 inches to about 1.25 inches, preferably about 0.25 inches to about 1 inch, wherein the first fibrous mat is attached as a facer cover sheet to the front surface of the gypsum core layer, and a second fibrous mat is attached as a backer cover sheet to the rear surface of the gypsum core layer. The gypsum core layer comprises more than about 50 wt. % calcium sulfate dihydrate, preferably at least about 75 wt. %, more preferably at least about 85 wt. %. The first fibrous mat and second fibrous mat may comprise paper or fibrous material (e.g., one or more of polymer fibers, glass fibers, and mineral fibers).

In the present specification, all weight percent values unless otherwise indicated are in weight percent. As used herein, "total dry weight" or "on a dry weight basis" refers to the weight of a mixture excluding any water component that may be present. "Water component" excludes the water that may be present in a gypsum crystal structure. In contrast, a "wet basis" includes water in the wt. % calculation.

Gypsum Board

A gypsum board is a gypsum product having a board shape (i.e., being in particular, at least substantially flat). The gypsum board typically has a rectangular shape.

Figure 1:
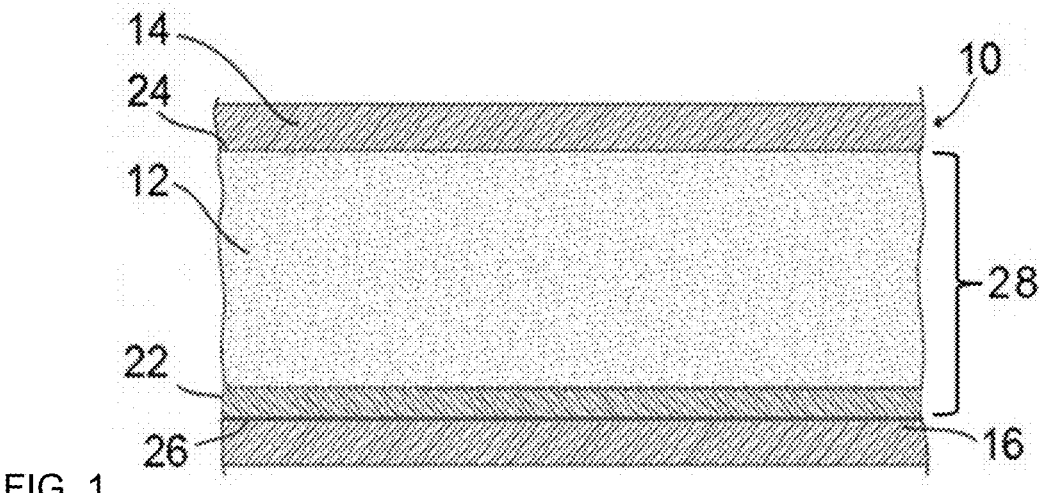
FIG. 1 shows a cross-sectional view of a gypsum board of the invention, in which a board core (gypsum core) is between a front cover sheet and a back cover sheet.
Figure 2:
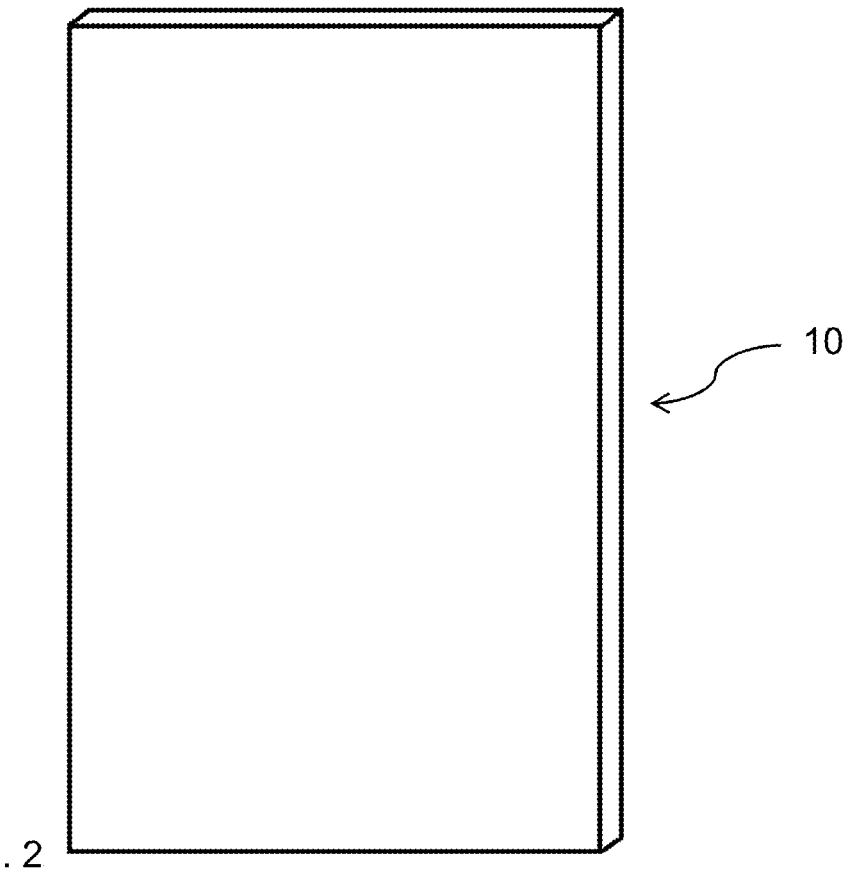
FIG. 2 shows a top (axial) view of the gypsum board of FIG. 1.

FIG. 1 depicts an example of a wallboard panel 10 of the invention. FIG. 2 shows a top (axial) view of the wallboard panel 10. The board has a core 28 that comprises a set lower-density region (less dense region) 12 as a layer comprising calcium sulfate dihydrate and a set higher-density region (also known as a densified region, densified layer, or a thin dense gypsum layer) 22 as a layer comprising calcium sulfate dihydrate.

FIG. 1 depicts the wallboard panel 10 of the invention in which the core 28 that comprises a gypsum lower-density region 12 (for example 0.5 inch thick) is between a back cover sheet 14 (also known as a backer cover sheet) and a front cover sheet 16 (also known as a facer cover sheet), which may each be single-ply or multi-ply paper or fibrous material such as glass fiber mat. The inner surface of the back cover sheet 14 creates a bond side 24 of the back cover sheet 14 which faces the gypsum core 28. The gypsum core 28 having a thickness of about 0.25 inches to about 1.6 inches, typically about 0.25 inches to about 1.25 inches, preferably about 0.25 inches to about 1 inch. The inner surface of the front cover sheet 16 creates a bond side 26 of the front cover sheet 16 which faces the gypsum lower-density region 12. The higher-density region (thin dense gypsum layer) 22 lies between the gypsum lower-density region (less dense region) 12 and the front cover sheet 16 to contact the gypsum lower-density region 12 and the front cover sheet 16. The outer surface of the back cover sheet 14 faces wall framing (not shown) of a room after the wallboard panel 10 is installed as an interior wall. The outer surface of the front cover sheet 16 faces inside of a room after the wallboard panel 10 is installed as an interior wall.

Generally the relatively lower-density region 12 and relatively higher-density region 22 have the same composition and are contiguous with one another. However, the lower-density region may be formed from a gypsum slurry in a foamed state, whereas the higher-density region may be from a gypsum slurry that is not foamed so that a denser layer forms. That is, the higher-density region may have a lower porosity associated therewith than does the lower-density region.

The lower-density region (e.g., lower-density region 12 of FIG. 1) resulting from the set gypsum lower-density region slurry generally has a thickness of 0.25 inches to 1.5 inches, typically 0.3 inches to 1 inch, or 0.4 inches to 0.75 inches.

The higher-density region 22 has a thickness of about 0.02 inches to about 0.75 inches, or about 0.02 inches to about 0.35 inches. More typically the higher-density region 22 has a thickness of about 0.02 inches to about 0.2 inches (about 0.05 to about 0.5 cm), for example, from about 0.0625 inch to about 0.125 inch (about 0.16 to about 0.32 cm). Typically the thickness of the lower-density region layer 12 is greater than the thickness of the higher-density region layer 22. Typically the higher-density region (e.g., higher-density region 22 of FIG. 1) generally has a thickness of 2% to 60%, typically 2% to 50%, more typically 5% to 40% or more typically 5% to 25% of the thickness of the gypsum board 10.

The density of the higher-density region layer 22 is greater than the density of the lower-density region layer 12. The lower-density region 12 has a density of 15 to 55 pounds/cubic foot. Typically the higher-density region 22 has a density of 25 to 70 pounds/cubic foot, more typically 30 to 60, or furthermore typically 35 to 60 pounds/cubic foot.

When foamed, the gypsum lower-density region layer resulting from the set foamed gypsum slurry has a total void volume (total of water voids and air voids) of 50 to 92 volume percent. The set higher density region layer has a total void volume of less than 40 to 85 volume percent.

The combined density of the gypsum lower-density region 12 and the higher-density region 22 may be about 15 pounds/cubic foot to about 65 pounds/cubic foot, more typically 20 pounds/cubic foot to about 65 pounds/cubic foot, or 25 pounds/cubic foot to about 65 pounds/cubic foot, for example 25 pounds/cubic foot to 55 pounds/cubic foot.

Typically the gypsum board has a transverse width of 3 to 5 feet, wherein the set higher density region has an average thickness of 20-40 mil if measured from the number average of a series of 1 inch wide samples taken across the width of a transverse cross section of the board, wherein the set higher density region thickness of each sample has a +/−20 mil difference from the average thickness of set higher density region of the samples, wherein the minimum set higher density region thickness of the samples is at least 10 mils thickness, and wherein the ratio of the minimum thickness of the set higher density region of each of the samples/average thickness, expressed as a percentage, is 40-100%, typically 40-90%, 40-80%, or 45-80%.

For example, the thickness of the set higher density region of each sample can be determined by cutting the board vertically across the transverse width of the board into a plurality of samples, for example 48 one inch (across in the transverse direction) samples; and slicing each sample in a direction parallel to the front and back surfaces of the board to form a plurality of horizontal slices, for example 10-100 horizontal slices, of the sample. Then measure the density of each slice. The slices having a higher density represent the set higher density region. The slices having a relatively lower density represent the lower density region. The thickness of the total slices of a sample having the higher density represent the set higher density region thickness of that sample. The thicknesses of the set higher density region of the samples across the transverse direction of the board and location of each sample across the transverse with of the board are then tabulated and/or plotted to determine the transverse profile of the set higher density region across the board.

Methods for Manufacture of Gypsum Boards

Various methods can be employed for preparing a gypsum board of the present invention from an aqueous gypsum slurry comprising calcium sulfate hemihydrate.

The base material from which gypsum wallboard and other gypsum products are manufactured is the hemihydrate form of calcium sulfate ($CaSO_4 \cdot \frac{1}{2}H_2O$), commonly termed "calcined gypsum" or "stucco," which is produced by heat conversion (calcination) of the dihydrate form of calcium sulfate ($CaSO_4$).

The invention encompasses a method of making a gypsum board comprising:

preparing an aqueous gypsum slurry comprising a mixture of water and stucco, wherein the stucco comprises calcium sulfate hemihydrate, wherein the aqueous gypsum slurry comprises a mixture of:

at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and the water at a weight ratio of water to the calcium sulfate hemihydrate of 0.2:1 to 1.2:1; and depositing a front cover sheet (also known as a first cover sheet or face cover sheet or facer) over a forming surface and moving the front cover sheet horizontally in a machine direction along the forming surface;

depositing a first portion of the aqueous gypsum slurry over the front cover sheet to form a layer of the first portion of the aqueous gypsum slurry as a higher-density region in layer form contacting an upper surface of the front cover sheet, moving a back cover sheet (also known as a back cover
sheet or backer cover sheet or backer) along a back
cover sheet path comprising a first path segment and a
second path segment,
wherein the back cover sheet moves along the first path
segment above the higher-density region on the front
cover sheet with movement comprising a first vertical
movement component and/or a first horizontal move-
ment component, wherein the first vertical movement
component being movement in a direction downwards
towards the higher-density region on the front cover
sheet, wherein the first horizontal movement compo-
nent being movement in a direction opposite to the
machine direction,
preferably the back cover sheet moves along a down-
stream portion of the first path segment with movement
along a slope defining an angle "A" (See for example
FIGS. 3, 5 and 6) between the back cover sheet in the
first path segment and the front cover sheet on the
forming surface of 0 to 90 degrees, typically the angle
"A" is 0 to 90 degrees, more typically the angle "A" is
5 to 90 degrees or 5 to 85 degrees, more typically the
angle "A" is 20 to 60 degrees by having the first vertical
movement component and the first horizontal move-
ment component both simultaneously present along all
or a same portion of the first segment;
wherein a slurry mixer discharges a second portion of the
aqueous gypsum slurry, which is less dense than the
first portion of the aqueous gypsum slurry, to contact a
surface of the back cover sheet in the first path segment,
wherein the slurry contacts the back paper at an angle
of incidence "B" of 0 to 90 degrees, for example 0 to
20 degrees, preferably 5 to 90 degrees, furthermore
preferably 5 to 85 degrees, furthermore preferably 5 to
60 degrees relative to the surface of the back cover
sheet contacted by the slurry,
typically the discharge of calcined gypsum core slurry is
in a direction of counter current flow with direction of
movement of the back cover sheet, or typically the
discharge of calcined gypsum core slurry may be in a
direction of concurrent flow with the direction of
movement of the back cover sheet;
at a downstream end of the first path segment the back
cover sheet then passes around a first transition roller to
feed the back cover sheet to the second path segment,
wherein the second path segment has an upstream end and
a downstream end, the upstream end at the first tran-
sition roller,
preferably the first transition roller changes the direction
of movement of the back cover sheet to movement
along a first portion of the second path segment that has
a second horizontal movement component in the
machine direction and a second vertical movement
component, the second vertical movement component
being upwards, or downwards, or neutral to provide
movement only along the second horizontal movement
component, typically the second vertical movement
component is movement in a direction upwards away
from the higher-density region on the front cover sheet;
wherein the first transition roller is spaced a distance
above the higher-density region on the front cover
sheet,
passing the second portion of the aqueous gypsum slurry
over the first transition roller to deposit a majority by
weight of the second portion of the aqueous gypsum
slurry on the higher-density region on the front cover
sheet, wherein typically as this deposition occurs a remainder of the second portion of the aqueous gypsum
slurry remains in contact with the back cover sheet as
the back cover sheet moves into the second path
segment,
wherein preferably the first transition roller is a free-
wheeling roller;
typically the second path segment has a first portion and
a second portion, wherein at a downstream end of the
first portion of the second path segment the back cover
sheet passes over a second transition roller to feed the
back cover sheet to the second portion of the second
path segment and change the direction of movement of
the back cover sheet;
at the downstream end of the second path segment depos-
iting the back cover sheet on the second portion of the
aqueous gypsum slurry on the face cover sheet to form
a multilayer assembly including the back cover sheet
on the second portion of the aqueous gypsum slurry,
typically the multilayer assembly includes the first
portion of aqueous gypsum slurry layer on the front
cover sheet, the second portion of aqueous gypsum
slurry layer on the first portion of aqueous gypsum
slurry layer, and the back cover sheet on the second
portion of aqueous gypsum slurry layer;
passing the multilayer assembly into a forming station for
forming the multilayer assembly, wherein preferably
the multilayer assembly passes under a forming plate of
the forming station;
setting the calcium sulfate hemihydrate to form a panel
comprising a gypsum core comprising calcium sulfate
dihydrate; and
drying the panel and cutting the panel into a gypsum
board having one or more pre-determined dimensions,
wherein the first portion of the gypsum slurry forms a
higher-density region in layer form contacting the front
cover sheet;
wherein the second portion of the gypsum slurry is in a
foamed state as a lower-density region contacting the
higher-density region, the higher-density region having
a higher density than the lower-density region; and
wherein the board core comprises a set lower-density
region comprising calcium sulfate dihydrate and a set
higher-density region comprising calcium sulfate dihy-
drate, the set higher-density region being interposed as
a layer between the set lower-density region and the
front cover sheet.

To produce gypsum board, the stucco is mixed with water
and, if desired, other additives to form an aqueous gypsum
slurry which is continuously fed between continuous layers
of paper on a board machine. One cover sheet is called the
front cover sheet, or front cover sheet or facer. The other
cover sheet is called the back cover sheet, or backer. Since
gypsum board is normally formed "face down," this front
cover sheet typically corresponds to the facer (front cover
sheet) upon completion of the fabrication process. Typically
the stucco is mixed with water and additives to form an
aqueous slurry which is continuously fed between continu-
ous layers of sheets, e.g., paper sheets, on a board machine.
To form the aqueous gypsum slurry, dry and/or wet com-
ponents of the aqueous gypsum slurry are fed to a mixer
(e.g., a pin or pinless mixer), where they are agitated. The
aqueous gypsum slurry can be made with any suitable
water/calcium sulfate hemihydrate ratio. As the board moves
down a conveyer line to form a panel the calcium sulfate
hemihydrate recrystallizes or rehydrates, to revert to calcium
sulfate dihydrate in its original rock state. The cover sheet becomes bonded to the core as the gypsum sets. The panel is then cut to length and conveyed through dryers to remove any free moisture.

The method deposits a first layer of aqueous gypsum slurry and a second layer of aqueous gypsum slurry. The first layer of aqueous gypsum slurry is relatively denser than the second layer of aqueous gypsum slurry. The method includes depositing the relatively denser layer on the first cover sheet, typically a front cover sheet (also known as face cover sheet or face paper) horizontally moving in a machine direction along a forming surface, and direct core slurry distribution from a core slurry mixer directly onto the second cover sheet typically the back cover sheet (also known as back cover sheet or back paper) and subsequently drop the core slurry from the second cover sheet (back paper) to deposit on the relatively denser layer on the face paper.

Figure 3:
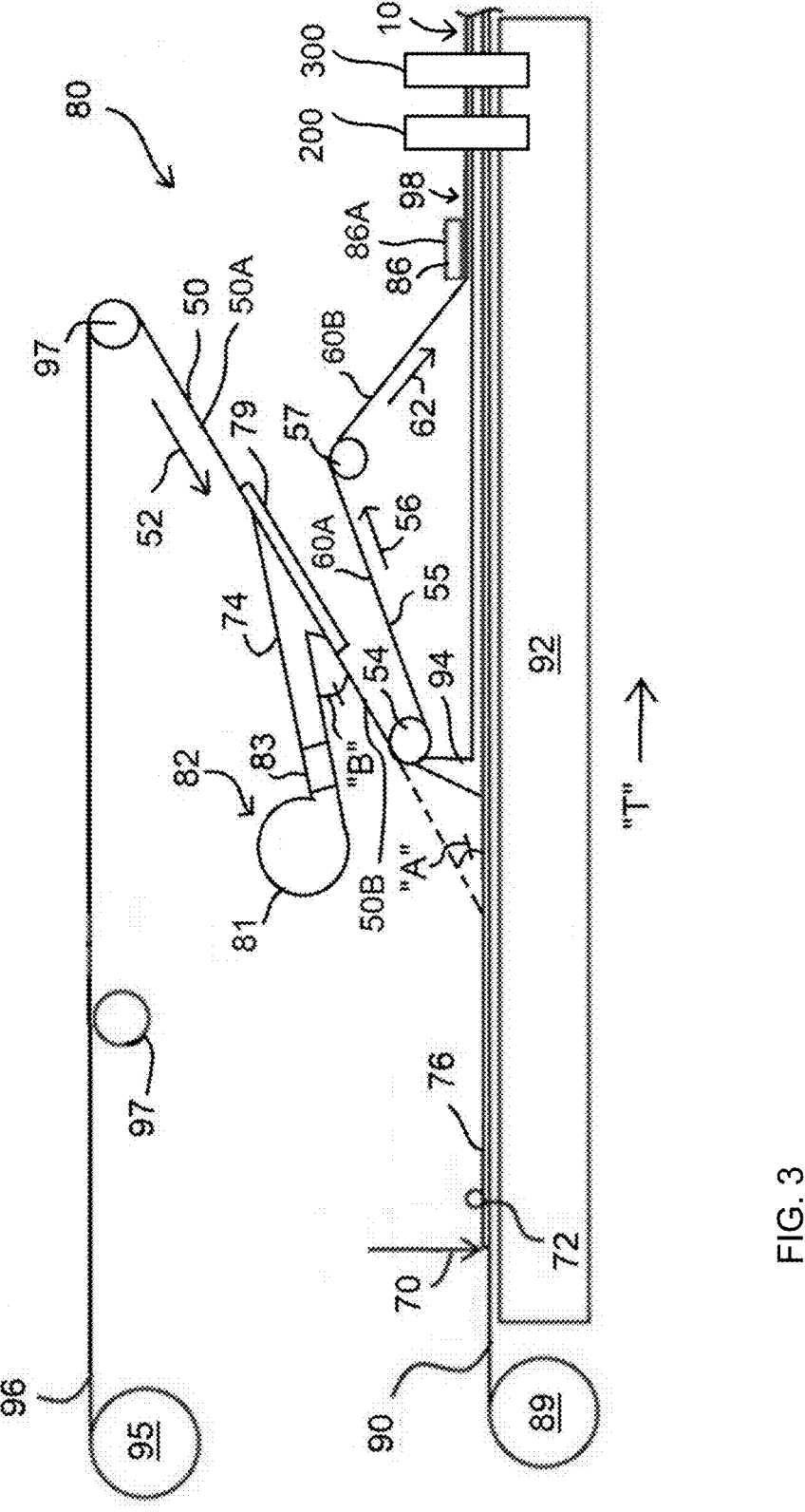
FIG. 3 shows a diagram of a version of the present method.

FIG. 3 shows a first embodiment of an apparatus for performing the present method. In particular, FIG. 3 illustrates an example of a wet end 80 (upstream portion) of a manufacturing production line for producing a layered gypsum board of the present invention having a gypsum layer between two cover sheets, and provided with the densified layer. The cover sheets are, for example, made of paper, for example manila paper or Kraft paper.

The wet end 80 includes a gypsum slurry mixing and dispensing assembly 82 and a forming station 86 having a forming plate 86A. FIG. 3 shows the stucco particles fed to the gypsum slurry mixing and dispensing assembly 82 as a stream 74. The gypsum slurry mixing and dispensing assembly 82 has a mixer 81 that is in a constant position in the wet end and a dispensing unit 83 out of the mixer 81 for conveying the slurry stream 74. The dispensing unit 83 typically includes a hose and optionally a boot (not shown) at a downstream end of the hose. A boot is an "L" shaped conduit.

A first moving web 90 of front cover sheet material (face sheet from a face paper roll 89) is deposited onto the forming surface 92 and moves in a longitudinal direction of travel (machine direction) "T" along the forming table 92. In particular, the method discharges the front cover sheet onto a moving conveyor 92. The gypsum lower-density region slurry 94 is mixed in the gypsum slurry mixing and dispensing assembly 82 where additives are added, and foaming of the slurry for the lower-density region layer (e.g. layer 12, FIG. 1) occurs. While the gypsum slurry mixing and dispensing assembly 82 is illustrated as a single component of the wet end 80, there can be multiple components that comprise the gypsum slurry mixing and dispensing assembly 82.

A first portion of the aqueous gypsum slurry (densified layer slurry) 70 is applied to the front cover sheet material 90 (for example face paper or glass mat) to form a densified layer (e.g. higher-density region 22, FIG. 1) on the front cover sheet material 90. The front cover sheet (face paper) 90 then passes under a densified layer roller 72 to spread the first portion of the aqueous gypsum slurry 70 to provide a first layer of aqueous gypsum slurry (relatively denser layer slurry) 76. Then the front cover sheet 90 with the layer 76 of the denser slurry 70 moves horizontally along the forming surface 92 in machine direction "T".

The densified layer slurry 70 may come from the gypsum slurry mixing and dispensing assembly 82 or a separate slurry mixer (not shown). A densified layer slurry 76 is applied to the second cover sheet material (back cover sheet material, for example paper or glass mat) 96 to form the second higher-density region layer (e.g. layer 20, FIG. 3). Typically the first portion of the aqueous gypsum slurry 70 is not foamed.

The back cover sheet 96 moves from a back cover sheet roll 95 along rollers to a back cover sheet (back paper) path comprising a first path segment 50, and a second path segment 55. Thus, the apparatus includes a back cover sheet drive defining the back cover sheet path having the first path segment 50 and the second path segment 55. In FIG. 3 the second path segment 55 has an upstream portion 60A and a downstream portion 60B. As seen in FIG. 3, the back cover sheet 96 travels alone (other than with the slurry it conveys) along the first path segment 50 and the second path segment 55 such that it is not traveling on a moving belt. This avoids problems arising from having a moving belt for conveying slurry.

The back cover sheet 96 moves in the first direction 52 with movement along the first path segment above the higher-density region on the front cover sheet, wherein the movement of the back cover sheet 96 along the first path segment has a first vertical movement component and/or a first horizontal movement component. The first vertical movement component being movement in a direction downwards towards the higher-density region 76 on the front cover sheet 90. The first horizontal movement component being movement in a direction opposite to the horizontal machine direction "T".

The first path segment 50 has an upstream portion 50A and a downstream portion 50B. Typically the back cover sheet moves along the downstream portion 50B of the first path segment 50 with movement along a slope defining an angle "A" between the back cover sheet 96 in the downstream portion 50B of the first path segment 50 and the front cover sheet 90 on the forming surface of 0 to 90 degrees, typically the angle "A" is 0 to 90 degrees, more typically the angle "A" is 5 to 90 degrees or 5 to 85 degrees, more typically the angle "A" is 20 to 60 degrees or 0 to 20 degrees by having the first vertical movement component and the first horizontal movement component both simultaneously present along all or a same portion of the first segment.

More preferably the first vertical movement component and the first horizontal movement component are both simultaneously present along all or a same portion of the first path segment 50. As a result, the back cover sheet 96 moves along at least the downstream portion 50B of the first path segment 50 in the first direction 52 of back-paper travel with a slope inclined downwardly towards the denser layer (higher-density region) on the front cover sheet 90 wherein the angle "A" is typically 5 to 85 degrees, for example, 20 to 60 degrees.

Figure 6:
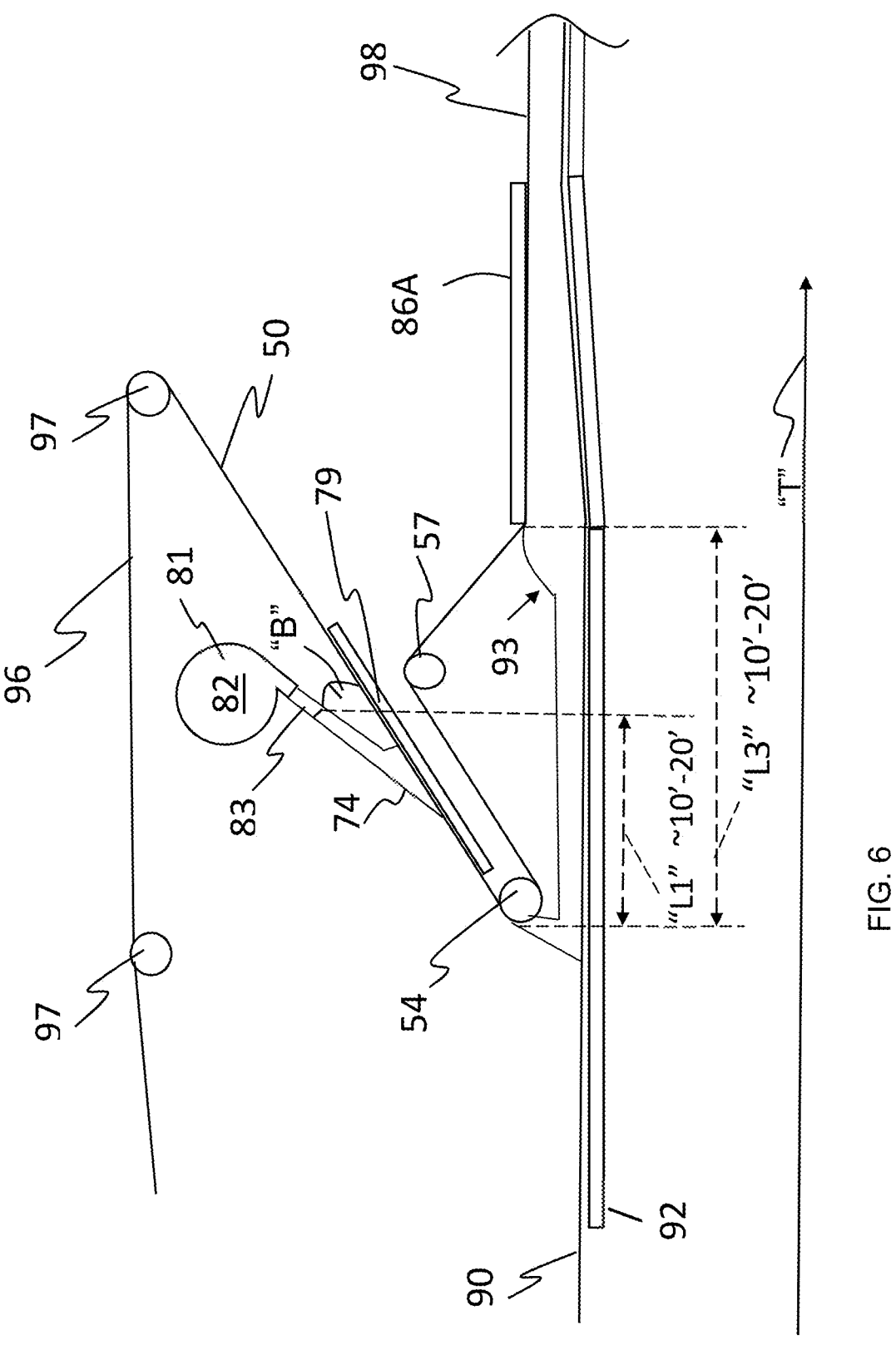
FIG. 6 shows a diagram of detailed aspects of an alternative version of the present method.
Figure 6A:
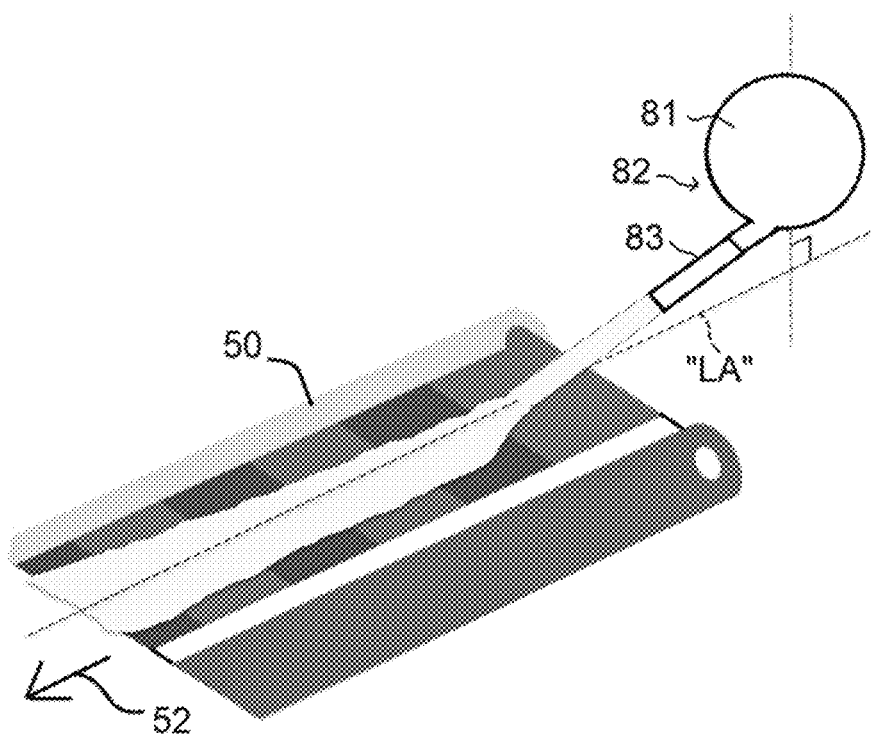
FIG. 6A shows a diagram of detailed aspects of version of the present method of FIG. 6.
Figure 6B:
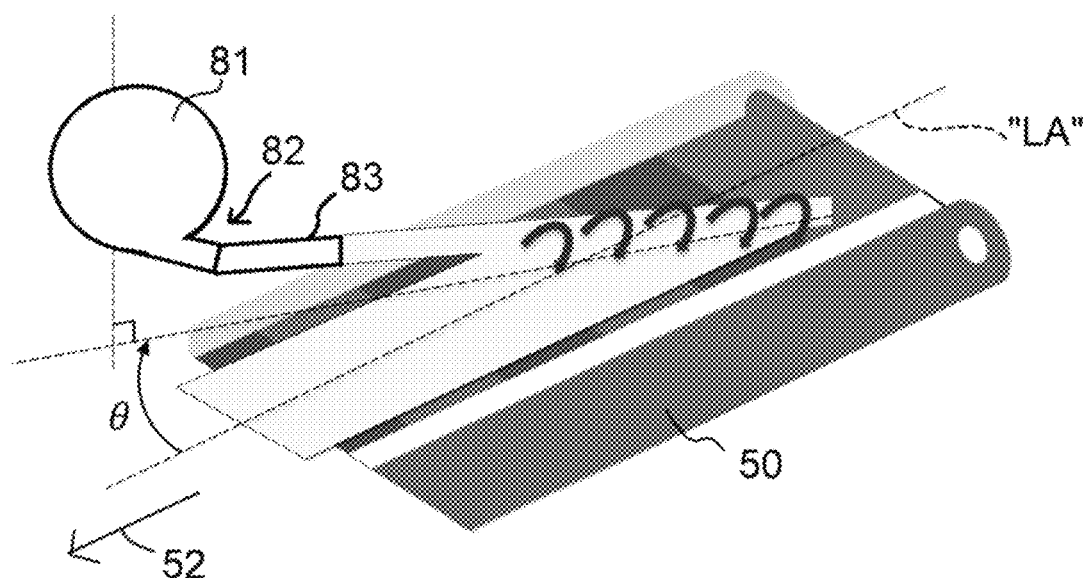
FIG. 6B shows a diagram of detailed aspects of another alternative version of the present method.
Figure 6C:
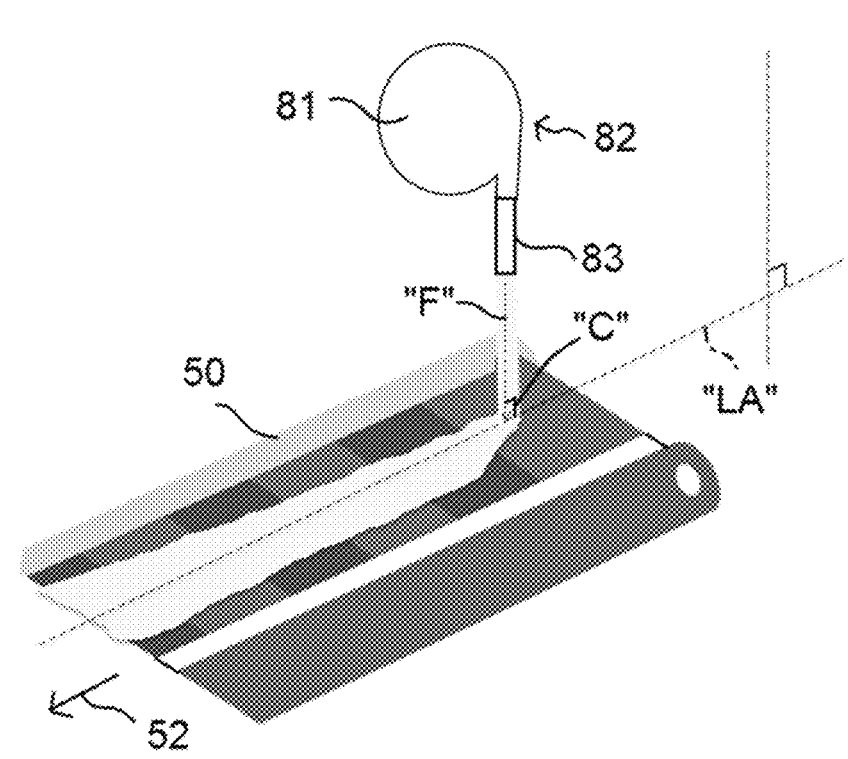
FIG. 6C shows a diagram of detailed aspects of another alternative version of the present method.
Figure 6D:
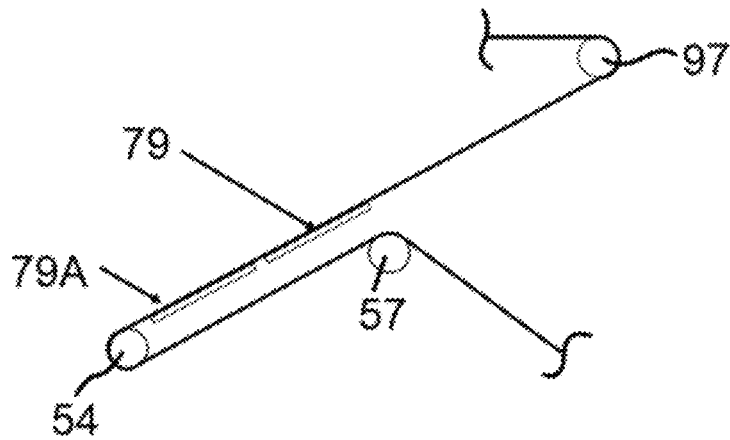
FIG. 6D shows a vibrating plate that can optionally be used in the present method.
Figures 6E, 7A, 7B:
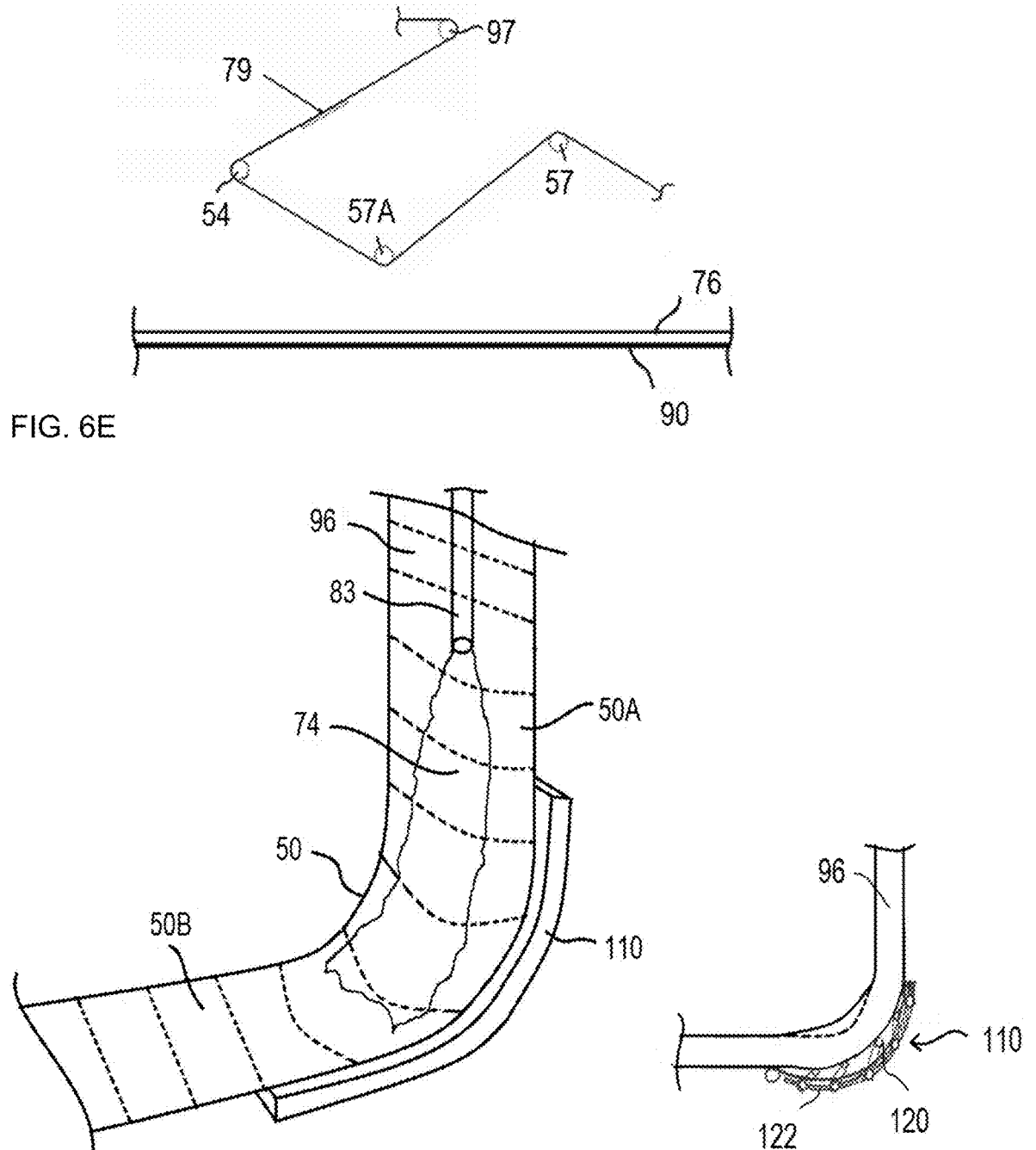
FIG. 6E shows an additional roller that may optionally be used in the present method.
FIG. 7A and FIG. 7B show a catenary roller system that may optionally be used for a first path segment of back cover sheet travel in the present method.

However, the first vertical movement component and the first horizontal movement component may be sequential along different portions of the first path segment 50, as for examples shown in a catenary support system of FIGS. 7A, 7B having a vertical upstream portion 50B for the first vertical movement followed by a horizontal portion downstream portion 50B for the first horizontal movement. This is discussed in more detail elsewhere in the specification.

The cover sheet materials may be uncoated or coated with, for example, a pre-applied outer surface polymer coating and a hydrophobic finish. Typically the outer surface of the applied moving webs 90 and 96 as well as the resulting outer surface of the front and back cover sheets of the gypsum board are uncoated and in contact with no additional layers.

The slurry outlet of the gypsum slurry mixing and dispensing assembly 82 discharges a second portion of the aqueous gypsum slurry 74 to contact a surface of the back cover sheet 96 in the first path segment 50. Typically the second portion of the aqueous gypsum slurry 74 is less dense than the first portion of the aqueous gypsum slurry 70. Typically the slurry outlet of the gypsum slurry mixing and dispensing assembly 82 discharges the second portion of the aqueous gypsum slurry 74 onto a portion of the back cover sheet 96 supported by a back-plate 79. This discharge of the second portion of the aqueous gypsum slurry 74 may be in a direction of counter current flow with the first direction of back-paper travel as shown in FIG. 3.

Like reference numerals in FIGS. 3, 5, 6, 6A-6E, 7A, 7B and 8 indicate like elements unless otherwise indicated.

Figure 5:
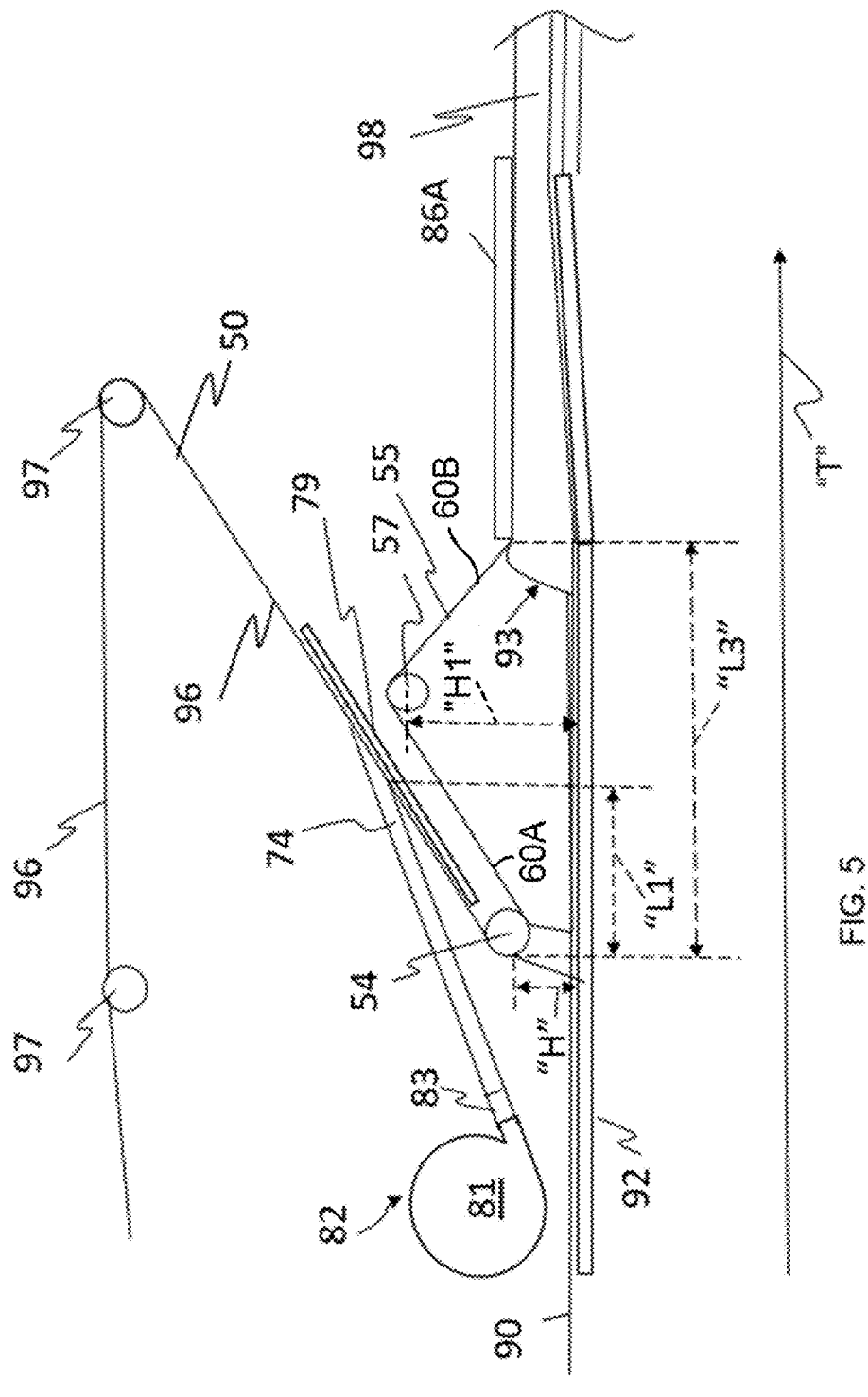
FIG. 5 shows detailed aspects of the diagram of FIG. 3.

Typically the apparatus of FIG. 5 and FIG. 6B deposits discharge of the second portion of the aqueous gypsum slurry 74 in a direction of counter current flow relative to the first direction 52 of back-paper travel along first path segment 50. The direction of the discharge is parallel and/or aligned with the longitudinal axis "LA" (see FIG. 6B) of the back-paper travel path along first path segment 50 at the point of contact with the aqueous gypsum slurry 74. FIG. 5 shows a distance "L1" from where the aqueous gypsum slurry from the slurry mixer 81 is deposited on the back cover sheet 96 to where the aqueous gypsum slurry drops onto the deposited first portion of aqueous gypsum slurry on the front cover sheet 90. The distance "L1" is typically 10-30 feet. FIG. 5 also shows a distance "L3" from where the discharge of the second portion of aqueous gypsum slurry from the slurry mixer 81 drops over roller 54 onto the deposited first portion of aqueous gypsum slurry to the forming plate 86A. The distance "L3" is typically 10 to 30 feet.

Typically the line speed in direction "T" is 1-20 feet/second, typically 2-10 feet/second.

In FIG. 6B this discharge of the second portion of the aqueous gypsum slurry 74 is in a direction of counter flow inclined deposition relative to the first direction 52 of back cover sheet travel along first path segment 50. This deposits discharge of the second portion of the aqueous gypsum slurry 74 in a direction of counter current flow with the first direction 52 of back-paper travel along the first path segment 50 but at a transverse angle θ relative to a longitudinal axis "LA" of the back-paper travel path along first path segment 50 at the point of contact with the aqueous gypsum slurry 74. Typically angle θ is +/−20 degrees relative to the longitudinal axis "LA".

In contrast, in the alternative as shown in FIG. 6 and FIG. 6A, this discharge of the second portion of the aqueous gypsum slurry 74 may be in a direction of concurrent flow with the first direction 52 of back-paper travel along the first path segment 50, wherein the direction of the discharge would be parallel and/or aligned with the longitudinal axis "LA" (see FIG. 6A) of the back-paper travel path (along first path segment 50 at the point of contact with the aqueous gypsum slurry 74.

FIG. 6 shows back cover sheet (back paper 96) traveling over rollers 97 and then along first path segment 50. Typically the gypsum slurry mixing and dispensing assembly 82 discharges to contact the second portion of the aqueous gypsum slurry 74 with the back cover sheet 96 at an acute angle of incidence "B" between the discharging second portion of the aqueous gypsum slurry 74 and the surface of the back cover sheet 96. For example, the acute angle of incidence "B" may be 0 to 60 degrees or 0 to 5 degrees or 5 to 60 degrees. This contact at an acute angle helps dissipate the second portion of the aqueous gypsum slurry 74 flow energy and helps in perpendicular flow (spread) of the second portion of the aqueous gypsum slurry 74. The second portion of the aqueous gypsum slurry 74 spread helps increase the subsequent area of contact when the second portion of the aqueous gypsum slurry 74 deposits as stream 94 onto the densified layer 76 effectively reducing the contact forces.

FIG. 6 shows a horizontal distance "L1" from the discharge opening of the hose or boot 83 that applies the second portion of the gypsum slurry 74 to the back cover sheet 96 to where the second portion of the gypsum slurry 74 drops off the transition roller 54 onto the deposited first portion of aqueous gypsum slurry on the front cover sheet 90. Typically the horizontal distance "L1" is 10-30 feet. FIG. 6 also shows the horizontal distance "L3" from where the discharge of the second portion of aqueous gypsum slurry from the slurry mixer 81 drops over roller 54 onto the deposited first portion of aqueous gypsum slurry on the front cover sheet 90 to the forming plate 86A. The distance "L3" is 10 to 30 feet.

In another alternative as shown in FIG. 6C, this discharge of the second portion of the aqueous gypsum slurry 74 may be in a direction of perpendicular flow deposition relative to the first direction 52 of back cover sheet travel along first path segment 50. This deposits discharge of the second portion of the aqueous gypsum slurry 74 in a direction "F" of perpendicular flow with the first direction 52 of back-paper travel along the first path segment 50 but at an angle of incidence "C" of 90 degrees+/−10 degrees, preferably 90 degrees+/−5 degrees, more preferably 90 degrees+/−2 degrees relative to a longitudinal axis "LA" of the back-paper travel path along first path segment 50 at the point of contact with the aqueous gypsum slurry 74. Typically the angle of incidence "C" is 90 degrees relative to the longitudinal axis "LA".

An enhanced spread in the invention can be achieved by incorporating a vibrating support (see optional vibrating plate 79A of FIG. 6D) if needed.

FIG. 6E shows an additional roller 57A that may optionally be used in the present method such that the back cover sheet 96 continues to travel downwardly after moving from roller 54 to additional roller 57A which then redirects the back cover sheet 96 upwardly to roller 57.

FIGS. 7A and 7B show a catenary roller system 110 that may be used for a first path segment 50 of back cover sheet travel that may optionally be used in the present method. FIG. 7A shows that this catenary roller system provides the back cover sheet 96 in the first path segment 50 with a first portion 50A for the first vertical movement component and a second portion 50B for the first horizontal movement component. The back cover sheet rolls over the catenary roller system 110 as shown in FIG. 7A. Catenary systems generally have straight rollers along the center and inclined rollers along each side to form a path curved in both the cover sheet direction of travel direction and its transverse direction for the back cover sheet. Thus, the first vertical movement component and the first horizontal movement component are sequential along these different portions 50A, 50B of the first path segment 50. The slurry may be first directed from hose 83 to contact the vertical portion 50A and then the slurry continues onto the horizontal portion 50B all the way to the roller 54 (see FIG. 6).

FIG. 7B shows a side view of the catenary roller system 110 having a base 122 and rollers 120 with the back cover sheet 96 travelling on the rollers 120.

The gypsum slurry mixing and dispensing assembly 82 comprises a main body and a discharge conduit (e.g., a gate-canister-boot arrangement as known in the art, or an alternative arrangement, such as that described in U.S. Pat. Nos. 6,494,609 and 6,874,930. For example, the gypsum slurry mixing and dispensing assembly 82 comprises a mixer 81 and two slurry discharge conduits. One slurry discharge conduit (not shown) connected to the mixer 81 to provide the first portion of the aqueous gypsum slurry (denser slurry) 70 to the front cover sheet 90. Another conduit 83 discharging the second portion of the aqueous gypsum slurry 74 onto the back cover sheet 96. However, these devices would be modified according to the present invention to not direct their slurry discharge conduit directly from the mixer to the denser layer on the front cover sheet. The present invention would direct their discharge to the back cover sheet and then have the discharged slurry drop from the back cover sheet onto the front cover sheet located there below.

Embodiments of the invention may comprise adding a foaming agent to the second portion of the aqueous gypsum slurry 74 to make the less dense layer of the core layer of the gypsum board. The foaming agent may or may not include alpha-sulfo fatty acid di-salts.

Typically the second portion of the gypsum slurry is disposed in a foamed state as a lower-density region contacting the higher-density region, the higher-density region having a higher density than the lower-density region. Thus, after mixing, the aqueous gypsum slurry optionally has foam added to decrease the product density. Foam is generated by combining soap and water. The foam may then be injected into the aqueous gypsum slurry after it exits from the mixer through a hose or chute. Foam is typically added to the second portion of aqueous gypsum slurry for the less dense layer of the core, but not for the first portion of slurry for the densified layer (relatively denser layer of the core).

Foaming agent (typically soap) can be added in the discharge conduit of the mixer (e.g., in the gate as described, for example, in U.S. Pat. Nos. 5,683,635 and 6,494,609, which are incorporated herein by reference) or in the main body, if desired. Slurry discharged from the discharge conduit after all ingredients have been added, including foaming agent, is the primary gypsum slurry and is used to form the lower-density region layer. However, these devices would be modified according to the present invention to not direct their slurry discharge conduit directly from the mixer to the denser layer on the front cover sheet. The present invention would direct their discharge to the back cover sheet.

In particular, at a downstream end of the first path segment 50 the back cover sheet 96 passes around a first transition roller 54 to feed the back cover sheet 96 to the second path segment 55 and change the direction of movement of the back cover sheet 96 to a second direction of back-paper travel 56.

The second path segment 55 takes up the back cover sheet 96 and pivots it to be further above the front cover sheet 90. The second path segment 55 has an upstream end and a downstream end, the upstream end at the first transition roller 54. Preferably the first transition roller 54 changes the direction of movement of the back cover sheet 96 to movement along a first portion 60A of the second path segment 55 that has a second horizontal movement component in the machine direction and a second vertical movement component, the second vertical movement component being upwards, or downwards, or neutral to provide movement only along the second horizontal movement component, typically the second vertical movement component is movement in a direction upwards away from the higher-density region on the front cover sheet.

However, as shown in FIG. 3, in a first portion 60A of the second path segment 55, the movement in the second direction 56 of back-paper travel has a second vertical movement component and a second horizontal movement component. The second vertical movement component being movement in a direction upwards away from the denser layer 76 on the front cover sheet 90. The second horizontal movement component being movement in the machine direction.

The second portion of the gypsum slurry 74 passes over the first transition roller 54 to deposit a majority of the second portion of the gypsum slurry 94 on the denser layer 76 on the front cover sheet 90. The first transition roller 54 spaced a distance "H" above the higher-density region on the front cover sheet for passing the core slurry over the first transition roller to deposit a majority of the core slurry on the higher-density region on the front cover sheet. The majority of the second portion of the gypsum slurry 74 drops away from the back cover sheet 74 as stream 94 and travels across the distance "H". Distance "H" in the present invention is typically 2 to 18 inches, more typically 2 to 12 inches, or 4-8 inches, for example 2, 3, 4, 5 or 6 inches. As this deposition occurs a remainder of the second portion of the gypsum slurry 74 remains in contact with the back cover sheet 96 as the back cover sheet 96 moves into the second path segment 55. In other words, the second portion of the gypsum slurry 74 is conveyed or 'rains-down' as stream 94 from the back cover sheet 96 at the downstream end of the first path segment 50 onto the denser layer 76 on the front cover sheet 90 with part of the second portion of the gypsum slurry still in contact with the back cover sheet 96 as the back cover sheet 96 moves along the second path segment 55. The first transition roller 54 is preferably a freewheeling roller.

The velocity of the second portion of the gypsum slurry 74 would have been slowed down by the time it reaches the downstream end of the first path segment relative to its velocity when it initially contacted the back paper. Thus, the second portion of the gypsum slurry 74 deposits from the back cover sheet 96 onto the relatively denser layer (also known as a densified layer) 76 at a lower velocity than the second portion of the gypsum slurry 74 had when it initially contacted the back cover sheet 96 in the first path segment 50.

At the downstream end of the first portion 60A of the second path segment 55 the back cover sheet then optionally passes over a second transition roller 57 to feed the back cover sheet 96 to a second portion 60B of the second path segment 55 and change the direction of movement of the back cover sheet 96 to a third direction of back-paper travel 62.

At a downstream end of the second path segment 55 the back cover sheet 96 is deposited on the second portion of the gypsum slurry 94 on the face paper 90 to form a multilayer assembly (sandwich assembly) with the slurry between the two facing materials. The resulting multilayer assembly is in the form of a wet assembly, which is a precursor to the final gypsum board product. Then the multilayer assembly to a forming station 86 and typically passes under a forming plate 86A of the forming station 86 to compress the layers into a desired total thickness. The resultant structure is a gypsum board preform 98. In FIG. 5 the second path segment 55 has an upstream portion 60A and a downstream portion 60B. The second transition roller 57 at the beginning of the downstream portion 60B of the second path segment 55 (or in other words at the downstream end of the upstream portion 60A of the second path segment 55) is preferably at a sufficiently raised position of a distance "H1" for a head 93

(See FIG. 5) of aqueous gypsum slurry at the downstream end of the third second path segment 55 to be visible and for ease of operators to manage and access the forming plate region.

Figure 4:
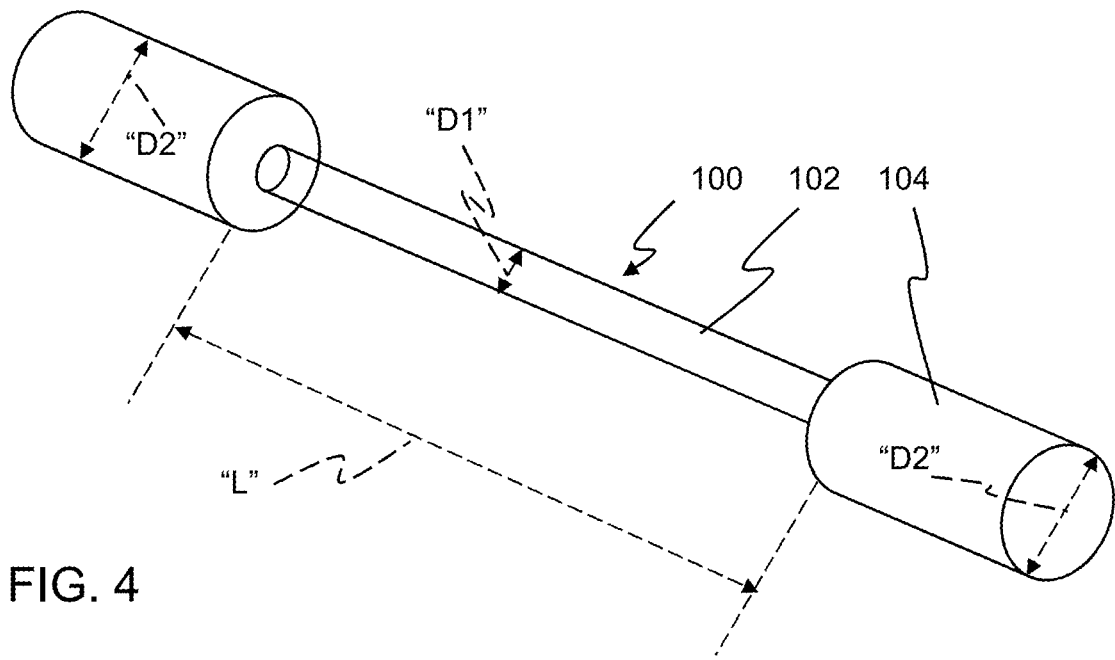
FIG. 4 shows a bare-center shaft roller.

The second transition roller 57 may be a freewheeling roller or a driven roller. Optionally the second transition roller 57 can be a bare-center shaft roller to reduce the cleaning load on this roller since it is in the same side as the slurry-exposed side of the back-paper. FIG. 4 shows the bare-center shaft roller 100 having a central shaft 102 of a first diameter "D1" and opposed cylindrical end portions 104 of a second diameter "D2", wherein the second diameter "D2" is larger than the first diameter "D1". The center bare-shaft roller avoids cleaning at the second transition roller 57 exposed to gypsum slurry on the back cover sheet 96. The opposed cylindrical end portions 104 are spaced a length "L" that is greater than the spread on the relatively denser slurry 70 on the front cover sheet 90.

The height of the forming plate or other forming device above the front front cover sheet 16 determines the thickness of the board. Next the continuous multilayer assembly is cut in a cutting station 200 into appropriate lengths at a cutting knife, usually eight feet to twelve feet. As the board moves down a conveyer line to form a panel the slurry is allowed to harden (set). The calcium sulfate recrystallizes or rehydrates, reverting to its original rock state to form a board core comprising an interlocking crystalline matrix of set gypsum. The cover sheets become bonded to the core as the gypsum sets. The panel is then cut to length and conveyed through kilns or dryers 300 to remove any free moisture and result in the board 10. Temperatures in the kiln typically range from 450° F. to 500° F.

Additional components can be included in the wet end 80 of the manufacturing line.

Figure 8:
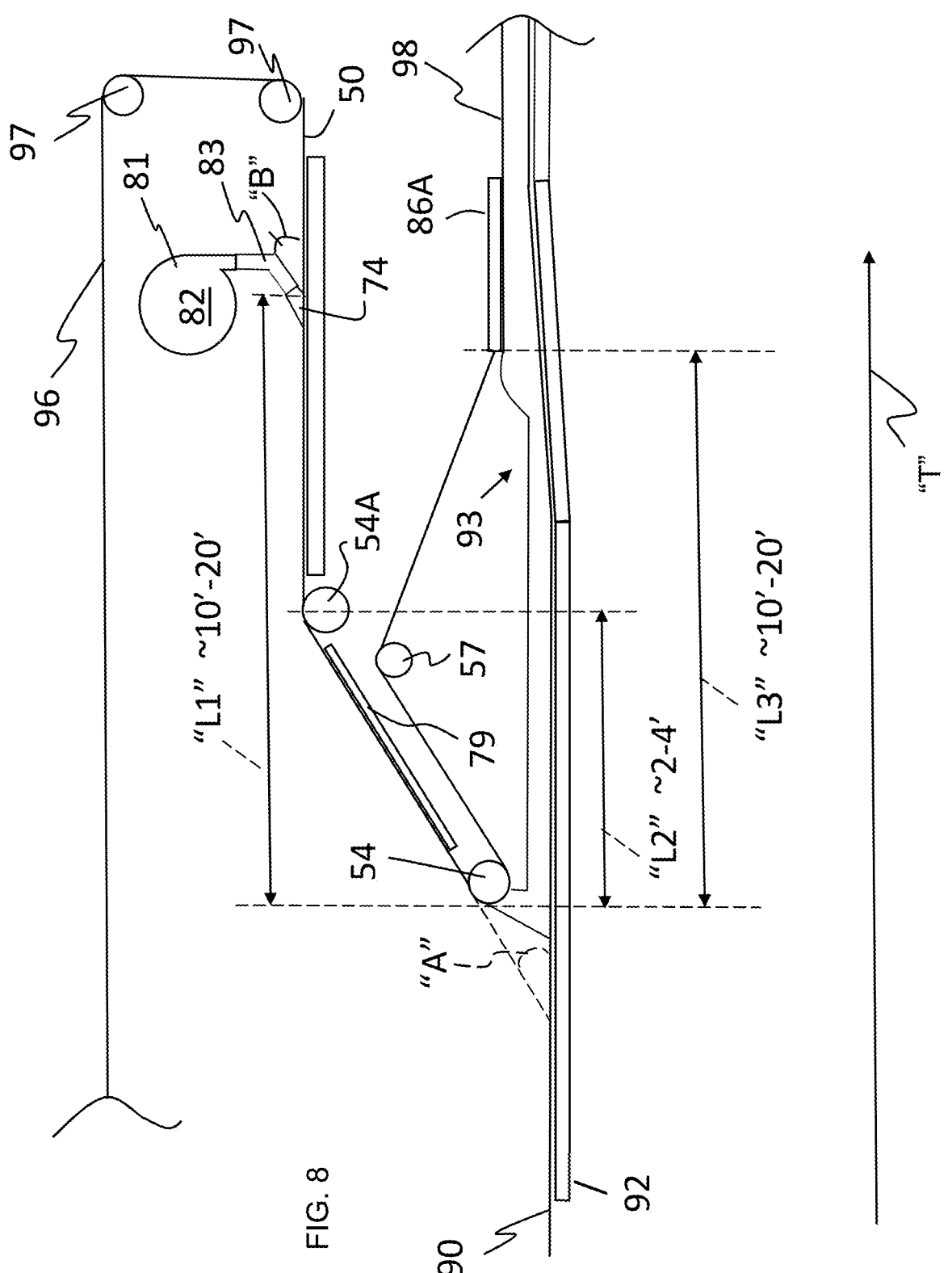
FIG. 8 shows detailed aspects of a diagram of another alternative version of the present method.

FIG. 8 shows detailed aspects of a diagram of another alternative version of the present method that is a modified version of the embodiment of FIG. 6. The second portion of aqueous gypsum slurry 74 is applied by a hose or boot 83 to an upstream portion of the first segment of travel of the back cover sheet 96 traveling horizontally in a direction opposite to the machine direction "T" to a roller 54A. FIG. 8 shows a horizontal distance "L1" from the discharge opening of the hose or boot 83 that applies the second portion of the gypsum slurry 74 to the back cover sheet 96 to where the second portion of the gypsum slurry 74 drops off the transition roller 54 onto the deposited first portion of aqueous gypsum slurry on the front cover sheet 90. Typically the horizontal distance "L1" is 10-30 feet. The back cover sheet 96 travels in a downwards slanted direction at a downstream end of the first segment of travel from a roller 54A to the transition roller 54. Typically the horizontal component of the slanted downstream end of the first segment of travel has a distance "L2". Distance "L2" is about 2-8 feet, typically about 2-6 feet. Typically the horizontal component of the slanted downstream end of the first segment of travel has a slant angle as does FIG. 3 angle "A". FIG. 8 also shows the horizontal distance "L3" from where the discharge of the second portion of aqueous gypsum slurry from the slurry mixer 81 drops over roller 54 onto the deposited first portion of aqueous gypsum slurry on the front cover sheet 90 to the forming plate 86A. The distance "L3" is 10 to 30 feet.

As described above, the front cover sheet is in interfacial contact with a higher-density region, also known as a densified layer. The densified layer is typically contiguous with the lower-density region layer after setting. Where foam is inserted into the discharge conduit, a stream of secondary gypsum slurry can be removed from the mixer body before foaming to provide a slurry for forming the densified layer. The densified layer is deposited onto the moving front cover sheet before the main portion of the gypsum slurry is deposited for forming the lower-density region layer. After being discharged from the discharge conduit, the gypsum slurry for the lower-density region is spread, as necessary, over the front cover sheet and the densified layer. The densified layer can be formed from the same or different gypsum slurry as the lower-density region layer.

The gypsum densified layer will be thinner and denser than the lower-density region layer. Thus, the gypsum densified layer slurry 70 is relatively denser than the gypsum lower-density region layer slurry 74 which may be a foamed gypsum slurry. Typically the calcined gypsum (calcium sulfate hemihydrate) slurry 94 for the lower-density region layer is foamed to be less dense than the slurry 70 of the densified layer. Thus if desired, calcined gypsum lower-density region layer slurry stream 74 may pass through a foamer device (not shown), which for instance mixes the calcined gypsum lower-density region layer slurry stream 74 with foam and/or air, prior to deposition on the front cover sheet material 90.

In the alternative, the densified layer can be achieved by directing a portion of the gypsum slurry out of the mixer and into a densified layer mixer prior to introduction of foam into the gypsum slurry or by beating foam out of the gypsum densified layer slurry.

Thus, the gypsum lower-density region layer slurry 94 for the lower-density region layer of the board is deposited onto the gypsum densified layer slurry 70. Typically the gypsum lower-density region layer slurry stream 94 and the slurry stream 70 for the gypsum densified layer have the same composition. However if desired, the gypsum lower-density region layer slurry stream 94 and the slurry stream for the gypsum densified layer 70 can have different compositions and/or densities. All the gypsum slurries 70, 94 can come from the same gypsum slurry mixing and dispensing assembly 82. However, the calcined gypsum slurries 70, 94 can come from different mixing and dispensing assemblies to have different properties, such as different densities.

The gypsum densified layer roller 72, the forming table (conveyer belt) 92, the forming plate 86A can all comprise conventional equipment suitable for their intended purposes as is known in the art. The wet end 80 can be equipped with other conventional equipment as is known in the art.

The calcined gypsum in the gypsum slurries 70, 94 reacts with the water and sets as a conveyor moves the gypsum board preform 98 down a manufacturing line. The gypsum board preform 98 is dried and cut into segments of predetermined dimensions at a point along the line where the gypsum board preform 98 has set sufficiently. The segments can be dried (e.g., in a kiln) to drive off excess water, and processed to provide the final layered wallboard of desired dimensions.

The forming station is the location in the board line where wet board precursor is sized to a pre-determined width and thickness, and optionally, length. Thus, the forming station includes, or can be, the forming plate 86A or any device capable of performing a final mechanical spreading and/or shaping of the slurry across the width of the backing layer, many of which are known in the art. The forming station conforms the slurry thickness and width to the final desired thickness and width of a wet board precursor that, when set, will produce the cementitious board product. The final desired slurry thickness and width produced at the forming station can, of course, differ from the final thickness and width of the finished board product. For example, the slurry thickness and/or width can expand and/or contract during crystallization (i.e., setting) and drying of the slurry. Typically, the desired slurry thickness is substantially equal to the desired board thickness (e.g., about 0.375" (about 0.95 cm), about 0.5" (about 1.27 cm), about 0.625" (about 1.59 cm), about 0.75" (about 1.90 cm), or about 1" (about 2.54 cm). By way of illustration only, the final board thickness typically is within about + or −⅛" (about 0.32 cm) or less of the final slurry thickness.

Thus, the forming station includes the forming plate 86A or any other device that is capable of creating the desired slurry thickness and width of the wet board precursor. Suitable devices include, for example, forming plate 86A, a forming roller, a forming press, a screed, and the like. The particular device used will depend, in part, on the type of cementitious board being produced. In a preferred embodiment, for example when the board forming system is a gypsum board or acoustical panel forming system, the board forming station comprises a forming plate as is known in the art. The board forming system of any of the above embodiments optionally further comprises a blade for cutting wet board precursor or dry cementitious board product to the desired lengths, and/or a drying region capable of removing water from the set cementitious board.

Gypsum and Stucco (Calcined Gypsum)

The calcium sulfate hemihydrate component used to form the crystalline matrix of the gypsum panel core typically comprises beta calcium sulfate hemihydrate, water-soluble calcium sulfate anhydrite, alpha calcium sulfate hemihydrate, or mixtures of any or all of these, and obtained from natural or synthetic sources. The calcium sulfate hemihydrate is typically provided in the raw material known as stucco or calcined gypsum. In some aspects, the stucco may include non-gypsum minerals, such as minor amounts of clays or other components that are associated with the gypsum source or are added during the calcination, processing and/or delivery of the stucco to the mixer. The stucco can be fibrous or non-fibrous. Typically the raw stucco has at least 70 wt. % calcium sulfate hemihydrate, preferably at least 80 wt. % calcium sulfate hemihydrate, more preferably at least 85 wt. % calcium sulfate hemihydrate, and furthermore preferably at least 90 wt. % calcium sulfate hemihydrate.

Additives

In addition to the set stabilizer particles of the present invention, other additives may be present in the gypsum slurry used to form the board core. Such additives may include, but are not limited to, strengthening agents, foam (prepared from a suitable foaming agent), dispersants, polyphosphates (e.g., sodium trimetaphosphate), starches, retarders, accelerators, recalcination inhibitors, binders, adhesives, secondary dispersing aids, leveling or non-leveling agents, thickeners, bactericides, fungicides, pH adjusters, buffers, colorants, reinforcing materials, fire retardants, water repellants (for example siloxane), fillers, and mixtures thereof.

Additives and other components of the gypsum slurry may be added to the mixer in various ways. For example, various combinations of components may be pre-mixed before entering the mixer, either as one or more dry components and/or as one or more wet components. Singular components may similarly be introduced to the mixer in wet or dry form. If introduced in a wet form, the components may be included in a carrier fluid, such as water, in any suitable concentration.

Fibers can optionally be used in the methods and composition of the present invention. The fibers may include mineral fibers (also known as mineral wool), glass fibers, carbon fibers, and mixtures of such fibers, as well as other comparable fibers providing comparable benefits to the wallboard. For example, glass fibers can be incorporated in the gypsum lower-density region slurry and/or the higher-density region layer slurry and resulting crystalline core structure. The glass fibers in such aspects may have an average length of about 0.5 to about 0.75 inches and a diameter of about 11 to about 17 microns. In other aspects, such glass fibers may have an average length of about 0.5 to about 0.675 inches and a diameter of about 13 to about 16 microns. In yet other aspects, E-glass fibers are utilized having a softening point above about 800° C. or above at least about 900° C. Mineral wool or carbon fibers such as those known to those of ordinary skill may be used in place of or in combination with glass fibers.

Fibers, when included, can be present in the gypsum low density layer slurry and/or the gypsum high density layer slurry in amounts on a dry basis per 100 pbw of calcium sulfate hemihydrate of about 0.5 to about 10 pbw; preferably about 1 to about 8 pbw; more preferably about 2 to about 7 pbw; and most preferably about 3 to about 6 pbw. There may also be an absence of fibers.

Optionally, one or more phosphate-containing compounds can also be included in the slurry, if desired. For example, these phosphate-containing components can include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salts. Illustrative examples are described in U.S. Pat. Nos. 6,342,284; 6,632,550; 6,815, 049; and 6,822,033, which are incorporated herein by reference in their entirety.

Phosphate-containing components can enhance green strength, resistance to permanent deformation (e.g., sag), dimensional stability, and the like. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is commonly used, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphates usually are added in a dry form and/or an aqueous solution liquid form, with the dry ingredients added to the slurry mixer, with the liquid ingredients added to the mixer, or in other stages or procedures.

When present, the phosphate can be included in the gypsum slurry in a dry form or in a form in water (e.g., a phosphate solution from about 5% to about 20%, such as about a 10% solution). If included, the phosphate can be present in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco. There may also be an absence of phosphate.

The gypsum slurry can optionally include at least one dispersant to enhance fluidity. The dispersant(s) may be introduced to the gypsum slurry in a dry form, optionally with other additives, and/or in a liquid form, optionally with other liquid components. Examples of suitable dispersants include naphthalene sulfonates, such as polynaphthalene sulfonic acid and its salts (polynaphthalenesulfonates) and derivatives, which are condensation products of naphthalenesulfonic acids and formaldehyde, as well as polycarboxylate dispersants, such as polycarboxylic ethers, for example. Other examples of suitable dispersants include lignosulfonates or sulfonated lignin. Lignosulfonates are water-soluble anionic polyelectrolyte polymers, which are byproducts from the production of wood pulp using sulfite pulping.

Lower molecular weight dispersants may be desirable. Lower molecular weight naphthalene sulfonate dispersants may be favored because they trend to a lower water demand than higher viscosity, higher molecular weight dispersants. Thus, molecular weights from about 3,000 to about 10,000 (e.g., about 8,000 to about 10,000) may be desirable molecular weights for a dispersant. If desired, the molecular weight of the polycarboxylate dispersants can be from about 20,000 to about 60,000, which may exhibit less retardation than dispersants having molecular weights above about 60,000.

Typical naphthalenesulfonates are a naphthalene sulfonate solution in water, having a range of about 35% to about 55% by weight naphthalenesulfonate solids content. However, if desired the naphthalenesulfonates can be used in dry solid or powder form.

When present, the dispersant can be included in the gypsum slurry in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, or the like. There may also be an absence of any one or more of polynaphthalenesulfonates, polycarboxylic ethers or lignosulfonates.

Accelerators and/or retarders may be added to the gypsum low density layer slurry and/or the high density layer slurry to modify the rate at which the calcium sulfate hemihydrate hydration reactions take place. Suitable accelerators may include, for example, wet gypsum accelerator, heat resistant accelerator (HRA), or climate stabilized accelerator (CSA). "CSA" is a set accelerator including 95% calcium sulfate dihydrate co-ground with 5% sugar and heated to 250° F. (121° C.) to caramelize the sugar. CSA is made according to U.S. Pat. Nos. 3,573,947 and 6,409,825, herein incorporated by reference. Potassium sulfate is another potential accelerator. HRA (Heat Resistant Accelerator), which is an accelerator, is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. When present, the accelerator and/or retarder each can be incorporated in the gypsum slurry in an amount on a solid basis of, e.g., about 0% to about 10% by weight of the stucco (e.g., about 0.1% to about 10%), such as, for example, from about 0% to about 5% by weight of the stucco (e.g., about 0.1% to about 5%). Suitable accelerators may include, for example, calcium sulfate dihydrate, carbohydrate-coated calcium sulfate, calcium sulfate dihydrate/organic phosphonate, and calcium sulfate dihydrate/organic phosphate. There may also be an absence of accelerators and/or retarders.

Foam (also known as foam water) may optionally be introduced into the gypsum lower-density region slurry and/or the higher-density region slurry (preferably the gypsum lower-density region slurry) in amounts that provide the above mentioned reduced lower-density region density and panel weight. The foaming agent to produce the foam is typically a soap or other suitable surfactant. The introduction of foam in the gypsum lower-density region slurry in the proper amounts, formulations, and process will produce a desired network and distribution of voids within the lower-density region of the final dried wallboards. This void structure permits the reduction of the gypsum and other lower-density region constituents and the lower-density region density and weight, while maintaining desired panel structural and strength properties. If present, foaming agents may comprise a major weight portion of unstable component and a minor weight portion of stable component (e.g., where unstable and blend of stable/unstable are combined). The weight ratio of unstable component to stable component is effective to form an air void distribution within the set gypsum lower-density region, as described in U.S. Pat. Nos. 5,643,510; 6,342,284; and 6,632,550, which are incorporated herein by reference in their entirety. The approaches for adding foam to a gypsum lower-density region slurry are known in the art and one example of such an approach is discussed in U.S. Pat. No. 5,683,635, the disclosure of which is incorporated by reference herein. Evaporative water voids, generally having voids of about 5 μm or less in diameter, also contribute to the total void distribution along with the aforementioned air (foam) voids. The volume ratio of voids with a pore size greater than about 5 microns to the voids with a pore size of about 5 microns or less, is from about 0.5:1 to about 9:1, such as, for example, about 0.7:1 to about 9:1, about 1.8:1 to about 2.3:1, or the like. The foaming agent is present in the gypsum slurry in an amount, for example, of less than about 0.5% by weight of the stucco, such as about 0.01% to about 0.5%, about 0.01% to about 0.2%, about 0.02% to about 0.4%, about 0.02% to about 0.2%, about 0.01% to about 0.1%, or the like. There may also be an absence of foaming agents.

Components for fire and/or water resistance can also be included in the gypsum slurry. Examples include, for instance, siloxanes (water resistance); fiber; heat sink additives such as aluminum trihydrate (ATH), magnesium hydroxide or the like; and/or high expansion particles (e.g., expandable to about 300% or more of original volume when heated for about one hour at 1560° F.). Further disclosure on such additives may be found in U.S. Pat. No. 8,323,785, which is incorporated by reference in its entirety. High expansion vermiculite may be included, although other fire resistant materials can be included. If present, fire or water resistance additives can be included in any suitable amount as desired depending, e.g., on fire rating, and like performance parameters. For example, if included, the fire or water resistance additives can be individually present in an amount from about 0.5% to about 10% by weight of the stucco, such as from about 1% to about 10%, about 1% to about 8%, about 2% to about 10%, about 2% to about 8%, or the like.

If included, the siloxane may desirably be introduced in the form of an emulsion. The slurry may then be shaped and dried under conditions which promote the polymerization of the siloxane to form a highly crosslinked silicone resin. A catalyst which promotes the polymerization of the siloxane to form a highly crosslinked silicone resin can be added to the gypsum slurry. Solventless methyl hydrogen siloxane fluid can be used as the siloxane. This product is a siloxane fluid containing no water or solvents. It is contemplated that about 0.3% to about 1.0% of the siloxane may be used if desired, based on the weight of the dry ingredients. For example, if desired, about 0.4% to about 0.8% siloxane may be present in the gypsum slurry based on the dry stucco weight.

There may also be an absence of any one or more of these components for fire and/or water resistance. For example, there may be an absence of siloxane.

Water

Water is added to the slurry in any amount that makes a flowable slurry. The amount of water to be used varies greatly according to the application with which it is being used, the exact dispersant being used, the properties of the calcium sulfate hemihydrate, and the additives being used.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The water can be present in the gypsum lower-density region slurry and/or the higher-density region layer slurry of the present invention at a weight ratio of water to calcium sulfate hemihydrate of about 0.2:1 to about 1.2:1; preferably, about 0.3:1 to about 1.1:1; more preferably, about 0.6:1 to about 1:1; most preferably 0.7:1 to 0.95:1; and typically about 0.85:1.

Back Cover Sheet and the Front Cover Sheet

The front and back cover sheets may be made of paper or other fibrous material, such as a mat of glass fibers. The back paper cover sheet and the front cover sheet may be made from any suitable paper material having any suitable basis weight.

If the front and back cover sheets are made of paper, the paper materials for each cover sheet may be the same or different.

Various paper grades can be used in gypsum panels, including Manila grade paper with a smooth calendared finish, often used as the facer paper cover sheet, and News-line paper with a rougher finish, often used as the backer paper cover sheet. Typically both paper grades are multi-ply with at least one liner ply and several filler plies. However, if desired at least one paper cover sheet or both paper cover sheets are made of single-ply paper.

Typically a back cover sheet only covers the back surface. In contrast, a front cover sheet covers the front surface of the board and also wraps around the board edges to contact the back cover sheet.

If desired, to enhance strength (e.g., nail pull strength), especially for lower density gypsum boards, one or both of the cover sheets can be formed from paper having a basis weight of, for example, at least about 45 lbs/MSF (e.g., from about 45 lbs/MSF to about 65 lbs/MSF, about 45 lbs/MSF to about 60 lbs/MSF, about 45 lbs/MSF to about 55 lbs/MSF, about 50 lbs/MSF to about 65 lbs/MSF, about 50 lbs/MSF to about 60 lbs/MSF, or the like). If desired, the front paper cover sheet may have a higher basis weight than does the back cover sheet, which may provide enhanced nail pull resistance and handling. The back paper cover sheet can have a somewhat lower basis weight if desired (e.g., a basis weight of less than 45 lbs/MSF, e.g., from about 33 lbs/MSF to 45 lbs/MSF (e.g., about 33 lbs/MSF to about 40 lbs/MSF).

Clauses of the Invention

The following clauses disclose various aspects of the invention.

Clause 1. A method for manufacturing a gypsum board comprising:

depositing a front cover sheet having first and second opposed surfaces over a forming surface, the front cover sheet first surface being a lower surface facing the forming surface and the front cover sheet second surface being an upper surface facing away from the forming surface, and moving the front cover sheet horizontally in a machine direction along the forming surface, depositing a first portion of aqueous gypsum slurry over the front cover sheet to form a layer of the first portion of aqueous gypsum slurry as a higher-density region in layer form contacting the upper surface of the front cover sheet, moving a back cover sheet having third and fourth opposed surfaces along a back cover sheet path comprising a first path segment and a second path segment downstream of the first path segment, wherein the back cover sheet moves along the first path segment above the higher-density region on the front cover sheet with movement comprising a first vertical movement component and/or a first horizontal movement component, wherein the first vertical movement component being movement in a direction downwards towards the higher-density region on the front cover sheet, wherein the first horizontal movement component being movement in a direction opposite to the machine direction, depositing a second portion of aqueous gypsum slurry, which is less dense than the first portion of aqueous gypsum slurry, to contact the third surface of the back cover sheet in the first path segment, wherein the second portion of aqueous gypsum slurry contacts the back cover sheet at an angle of incidence "B" of 0 to 90 degrees, for example 0 to 20 degrees, preferably 5 to 90 degrees, furthermore preferably 5 to 85 degrees or 5 to 60 degrees relative to the surface of the back cover sheet contacted by the slurry, wherein the first portion of aqueous slurry and the second portion of aqueous slurry each comprise a respective mixture of water and stucco, wherein the stucco comprises calcium sulfate hemihydrate, wherein the first portion of aqueous slurry and the second portion of aqueous slurry each comprise a respective mixture of at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and the water at a weight ratio of water to the calcium sulfate hemihydrate of 0.2:1 to 1.2:1;

then at a downstream end of the first path segment passing the back cover sheet with the second portion of aqueous gypsum slurry over a first transition roller spaced a distance above the higher-density region on the front cover sheet, while the fourth surface of the back cover sheet contacts the first transition roller, to deposit a majority by weight of the second portion of aqueous gypsum slurry that dropped away from the back cover sheet on the higher-density region on the front cover sheet, to form a layer of the second portion of aqueous gypsum slurry in a foamed state as a lower-density region in layer form contacting an upper surface of the higher density region, the higher-density region having a higher density than the lower-density region;

the back cover sheet then passes around the first transition roller to feed the back cover sheet to the second path segment, wherein the second path segment has an upstream end and a downstream end, the upstream end at the first transition roller, wherein typically as the deposition of the second aqueous gypsum slurry occurs a remainder of the second aqueous gypsum slurry remains in contact with the back cover sheet as the back cover sheet moves into the second path segment, and at the downstream end of the second path segment depositing the back cover sheet on the second portion of the aqueous gypsum slurry on the face cover sheet to form a multilayer assembly including the back cover sheet on the second portion of the aqueous gypsum slurry, typically the multilayer assembly includes the first portion of aqueous gypsum slurry layer on the front cover sheet, the second portion of aqueous gypsum slurry layer on the first portion of aqueous gypsum slurry layer, and the back cover sheet on the second portion of aqueous gypsum slurry layer;

passing the multilayer assembly into a forming station for forming the multilayer assembly, wherein preferably the multilayer assembly passes under a forming plate of the forming station;

setting the calcium sulfate hemihydrate of the respective first portion of aqueous gypsum slurry layer and second portion of aqueous gypsum slurry layer by reacting the calcium sulfate hemihydrate with the water of the respective first portion of aqueous slurry layer and the second portion of aqueous gypsum slurry layer to form a panel comprising a gypsum core of respective first and second board layers comprising calcium sulfate dihydrate between the front cover sheet and the back cover sheet, wherein the first board layer comprises a set higher-density region as a layer comprising calcium sulfate dihydrate and has a first board layer density, wherein the second board layer comprises a set lower-density region as a layer comprising calcium sulfate dihydrate and has a second board layer density lower than the first board layer density, the set higher-density region being interposed between the set lower-density region and the front cover sheet; and drying the panel and cutting the panel into the gypsum board.

Clause 2. The method of clause 1, wherein the back cover sheet moves along a downstream portion of the first path segment with movement along a slope defining an angle "A" between the back cover sheet in the downstream portion of the first path segment and the front cover sheet on the forming surface of 0 to 90 degrees, typically the angle "A" is 5 to 90 degrees or 5 to 85 degrees or 0 to 20 degrees or 5 to 20 degrees, more typically the angle "A" is 20 to 60 degrees by having the first vertical movement component and the first horizontal movement component both simultaneously present along all or a same portion of the first segment.

Clause 3. The method of clause 1 or 2, wherein the discharge of calcined gypsum core slurry is in a direction of counter current flow with direction of movement of the back cover sheet, or typically the discharge of calcined gypsum core slurry may be in a direction of concurrent flow with the direction of movement of the back cover sheet.

Clause 4. The method of any of clauses 1-3, wherein the first transition roller changes the direction of movement of the back cover sheet to movement along a first portion of the second path segment that has a second horizontal movement component in the machine direction and a second vertical movement component, the second vertical movement component being upwards, or downwards, or neutral to provide movement only along the second horizontal movement component, typically the second vertical movement component is movement in a direction upwards away from the higher-density region on the front cover sheet.

Clause 5. The method of any of clauses 1-4, wherein the first transition roller is a freewheeling roller.

Clause 6. The method of any of clauses 1-5, wherein the second path segment has a first portion and a second portion, wherein at a downstream end of the first portion of the second path segment the back cover sheet passes over a second transition roller to feed the back cover sheet to the second portion of the second path segment and change the direction of movement of the back cover sheet.

Clause 7. The method of any of clauses 1-6, wherein at the downstream end of the second path segment the multilayer assembly includes the first portion of aqueous gypsum slurry layer on the front cover sheet, the second portion of aqueous gypsum slurry layer on the first portion of aqueous gypsum slurry layer, and the back cover sheet on the second portion of aqueous gypsum slurry layer.

Clause 8. A method for manufacturing a gypsum board comprising:

preparing an aqueous gypsum slurry comprising a mixture of water and stucco, wherein the stucco comprises calcium sulfate hemihydrate, wherein the aqueous gypsum slurry comprises a mixture of:

at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and the water at a weight ratio of water to the calcium sulfate hemihydrate of 0.2:1 to 1.2:1; and depositing a front cover sheet over a forming surface and moving the front cover sheet horizontally in a machine direction along the forming surface;

depositing a first portion of the aqueous gypsum slurry over the front cover sheet to form a layer of the first portion of the aqueous gypsum slurry as a higher-density region in layer form contacting an upper surface of the front cover sheet, moving a back cover sheet along a back cover sheet path comprising a first path segment and a second path segment, wherein the back cover sheet moves along the first path segment above the higher-density region on the front cover sheet with movement comprising a first vertical movement component and/or a first horizontal movement component, wherein the first vertical movement component being movement in a direction downwards towards the higher-density region on the front cover sheet, wherein the first horizontal movement component being movement in a direction opposite to the machine direction, preferably the back cover sheet moves along a downstream portion of the first path segment with movement along a slope defining an angle "A" between the back cover sheet in the downstream portion of the first path segment and the front cover sheet on the forming surface of 0 to 90 degrees, typically the angle "A" is 0 to 90 degrees, more typically the angle "A" is 5 to 90 degrees or 5 to 85 degrees, more typically the angle "A" is 20 to 60 degrees by having the first vertical movement component and the first horizontal movement component both simultaneously present along all or a same portion of the first segment;

wherein a slurry mixer discharges a second portion of the aqueous gypsum slurry, which is less dense than the first portion of the aqueous gypsum slurry, to contact a surface of the back cover sheet in the first path segment, wherein the slurry contacts the back paper at an angle of incidence "B" of 0 to 90 degrees, for example 0 to 20 degrees, preferably 5 to 90 degrees, furthermore preferably 5 to 85 degrees, furthermore preferably 5 to 60 degrees relative to the surface of the back cover sheet contacted by the slurry, typically the discharge of calcined gypsum core slurry is in a direction of counter current flow with direction of movement of the back cover sheet, or typically the discharge of calcined gypsum core slurry may be in a direction of concurrent flow with the direction of movement of the back cover sheet;

at a downstream end of the first path segment the back cover sheet then passes around a first transition roller to feed the back cover sheet to the second path segment, wherein the second path segment has an upstream end and a downstream end, the upstream end at the first transition roller, preferably the first transition roller changes the direction of movement of the back cover sheet to movement along a first portion of the second path segment that has a second horizontal movement component in the machine direction and a second vertical movement component, the second vertical movement component being upwards, or downwards, or neutral to provide movement only along the second horizontal movement component, typically the second vertical movement component is movement in a direction upwards away from the higher-density region on the front cover sheet;

wherein the first transition roller is spaced a distance above the higher-density region on the front cover sheet, passing the second portion of the aqueous gypsum slurry over the first transition roller to deposit a majority by weight of the second portion of the aqueous gypsum slurry on the higher-density region on the front cover sheet, wherein typically as this deposition occurs a remainder of the second portion of the aqueous gypsum slurry remains in contact with the back cover sheet as the back cover sheet moves into the second path segment, wherein preferably the first transition roller is a freewheeling roller;

typically the second path segment has a first portion and a second portion, wherein at a downstream end of the first portion of the second path segment the back cover sheet passes over a second transition roller to feed the back cover sheet to the second portion of the second path segment and change the direction of movement of the back cover sheet;

at the downstream end of the second path segment depositing the back cover sheet on the second portion of the aqueous gypsum slurry on the front cover sheet to form a multilayer assembly including the back cover sheet on the second portion of the aqueous gypsum slurry;

passing the multilayer assembly into a forming station for forming the multilayer assembly, wherein preferably the multilayer assembly passes under a forming plate of the forming station;

setting the calcium sulfate hemihydrate to form a panel comprising a gypsum core comprising calcium sulfate dihydrate; and drying the panel and cutting the panel into a gypsum board having one or more pre-determined dimensions, wherein the first portion of the gypsum slurry forms a higher-density region in layer form contacting the front cover sheet;

wherein the second portion of the gypsum slurry is in a foamed state as a lower-density region contacting the higher-density region, the higher-density region having a higher density than the lower-density region; and wherein the board core comprises a set lower-density region comprising calcium sulfate dihydrate and a set higher-density region comprising calcium sulfate dihydrate, the set higher-density region being interposed as a layer between the set lower-density region and the front cover sheet.

Clause 9. The method of clause 1 or 8, wherein the forming of the layer of the aqueous gypsum slurry as a higher-density region in layer form contacting an upper surface of the front cover sheet comprises passing the front cover sheet under a slurry roller to spread the slurry of the higher-density region.

Clause 10. The method of clause 1 or 8, wherein the discharge of calcined gypsum core slurry may be in a direction of concurrent flow with the first direction of back cover sheet travel.

Clause 11. The method of clause 1 or 8, the discharge of calcined gypsum core slurry may be in a direction of counter current flow with the first direction of back cover sheet travel.

Clause 12. The method of clause 1 or 8, wherein the slurry mixer discharges the calcined gypsum core slurry onto a portion of the back-cover sheet supported by a back-plate.

Clause 13. The method of clause 6 or 8, wherein the second transition roller is a freewheeling roller or a driven roller.

Clause 14. The method of clause 6 or 8, wherein the second transition roller is a bare-center shaft roller having a central shaft of a first diameter and opposed cylindrical end portions of a second diameter, wherein the second diameter is larger than the first diameter.

Clause 15. The method of clause 6 or 8, wherein the second transition roller is at a sufficiently raised position relative to the front cover sheet moving along the forming surface for a head of aqueous gypsum slurry at the downstream end of the second path segment to be visible to an operator.

Clause 16. The method of clause 1 or 8, wherein the front cover sheet comprises at least one of a glass mat facer sheet or a paper facer sheet Clause 17. The method of clause 1 or 8, wherein the lower-density region comprises air bubbles.

Clause 18. The method of clause 1 or 8, wherein the set gypsum core comprises air bubbles, wherein the air bubbles have an average cross-section diameter of less than 1.5 mm, about 0.5 to about 0.8 mm, about 0.3 mm, or about 0.3 mm or less.

Clause 19. The method of clause 1 or 8, further comprising adding air to the aqueous gypsum slurry prior to depositing the aqueous gypsum slurry.

Clause 20. The method of clause 1 or 8, wherein the lower density region has a total air volume of about 30 vol. % to about 90 vol. %.

Clause 21. The method of claim 1, wherein the lower-density region resulting from the set gypsum lower-density region slurry has a thickness of 0.25 inches to 1.5 inches, typically 0.3 inches to 1 inch, or 0.4 inches to 0.75 inches;

wherein the higher-density region has a thickness of about 0.02 inches to about 0.75 inches, about 0.02 inches to about 0.35 inches, or about 0.02 inches to about 0.2 inches (about 0.05 to about 0.5 cm), wherein typically the thickness of the lower-density region layer is greater than the thickness of the higher-density region layer;

wherein the lower-density region has a density of 15 to 55 pounds/cubic foot, and wherein the higher-density region has a density of 25 to 70 pounds/cubic foot, more typically 30 to 60 pounds/cubic foot.

Clause 22. The method of clause 21, wherein the gypsum lower-density region layer resulting from the set foamed gypsum slurry has a total void volume of 50 to 92 volume percent, and the set higher density region layer has a total void volume of less than 40 to 85 volume percent, wherein the total void volume of the gypsum lower-density region layer is greater than the total void volume of the gypsum higher-density region layer.

Clause 23. An apparatus to manufacture a gypsum board according to the method of any of the clauses 1-22, comprising:

a forming surface for depositing thereon a front cover sheet and moving the front cover sheet horizontally in a machine direction along the forming surface;

a source of a first portion of the aqueous gypsum slurry in an unfoamed state for depositing the first portion of the aqueous gypsum slurry over the front cover sheet to form a layer of the aqueous gypsum slurry as a higher-density region in layer form contacting an upper surface of the front cover sheet, wherein the first aqueous gypsum slurry layer has a first slurry density, a back cover sheet drive comprising a first transition roller, and typically a second transition roller, for moving a back cover sheet along a back cover sheet path comprising a first path segment and a second path segment, wherein the first path segment is adapted and configured for moving the back cover sheet along the first path segment above the higher-density region on the front cover sheet with movement comprising a first vertical movement component and/or a first horizontal movement component, wherein the first vertical movement component being movement in a direction downwards towards the higher-density region on the front cover sheet, wherein the first horizontal movement component being movement in a direction opposite to the machine direction, a source of a second portion of the aqueous gypsum slurry, which is less dense than the first portion of the aqueous gypsum slurry, to contact a surface of the back cover sheet in the first path segment, wherein the second portion of the aqueous gypsum slurry contacts the back cover sheet at an angle of incidence "B" of 0 to 90 degrees, for example 0 to 20 degrees, preferably 5 to 90 degrees, furthermore preferably 5 to 85 degrees, furthermore preferably 5 to 60 degrees relative to the surface of the back cover sheet contacted by the second portion of the aqueous gypsum slurry, the first transition roller at a downstream end of the first path segment for passing the back cover sheet around the first transition roller to feed the back cover sheet to the second path segment, wherein the second path segment has an upstream end and a downstream end, wherein the second path segment upstream end is at the first transition roller, the first transition roller is spaced a distance above the higher-density region on the front cover sheet for passing the second portion of the aqueous gypsum slurry over the first transition roller to deposit a majority by weight of the second portion of the aqueous gypsum slurry that dropped away from the back cover sheet on the higher-density region on the front cover sheet, wherein typically as this deposition occurs a remainder of the second portion of the aqueous gypsum slurry remains in contact with the back cover sheet as the back cover sheet moves into the second path segment, wherein the first portion of aqueous gypsum slurry and second portion of aqueous gypsum slurry comprise a respective mixture of water and stucco, wherein the stucco comprises calcium sulfate hemihydrate, wherein the first portion of aqueous gypsum slurry and second portion of aqueous gypsum slurry respectively comprise a mixture of at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and the water at a weight ratio of water to the calcium sulfate hemihydrate of 0.2:1 to 1.2:1; and the downstream end of the second path segment located for depositing the back cover sheet on the second portion of the aqueous gypsum slurry on the front cover sheet to form a multilayer assembly including the back cover sheet on the second portion of the aqueous gypsum slurry;

a forming station for forming the multilayer assembly, preferably the forming station comprises a forming plate;

setting the calcium sulfate hemihydrate to form a panel comprising a gypsum core comprising calcium sulfate dihydrate; and wherein the first portion of the gypsum slurry is forms a higher-density region in layer form contacting the front cover sheet;

wherein the second portion of the gypsum slurry is in a foamed state as a lower-density region contacting the higher-density region, the higher-density region having a higher density than the lower-density region; and wherein the board core comprises a set lower-density region comprising calcium sulfate dihydrate and a set higher-density region comprising calcium sulfate dihydrate, the set higher-density region being interposed as a layer between the set lower-density region and the front cover sheet.

Clause 24. The apparatus of clause 22, further comprising a mixer for preparing an aqueous gypsum slurry for the first portion of aqueous gypsum slurry comprising a mixture of water, and stucco, wherein the stucco comprises calcium sulfate hemihydrate, wherein the aqueous gypsum slurry comprises a mixture of: at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and the water at a weight ratio of water to the calcium sulfate hemihydrate of 0.2:1 to 1.2:1.

Clause 25. The apparatus of clause 23 or 24, wherein the back cover sheet moves along a downstream portion of the first path segment with movement along a slope defining an angle "A" between the back cover sheet in the downstream portion of the first path segment and the front cover sheet on the forming surface of 0 to 90 degrees, typically the angle "A" is 0 to 90 degrees, more typically the angle "A" is 5 to 90 degrees or 5 to 85 degrees, more typically the angle "A" is 20 to 60 degrees by having the first vertical movement component and the first horizontal movement component both simultaneously present along all or a same portion of the first segment.

Clause 26. The apparatus of any of clauses 23-25, wherein the discharge of calcined gypsum core slurry is in a direction of counter current flow with direction of movement of the back cover sheet, or typically the discharge of calcined gypsum core slurry may be in a direction of concurrent flow with the direction of movement of the back cover sheet.

Clause 27. The apparatus of any of clauses 23-26, wherein the first transition roller changes the direction of movement of the back cover sheet to movement along a first portion of the second path segment that has a second horizontal movement component in the machine direction and a second vertical movement component, the second vertical movement component being upwards, or downwards, or neutral to provide movement only along the second horizontal movement component, typically the second vertical movement component is movement in a direction upwards away from the higher-density region on the front cover sheet.

Clause 28. The apparatus of any of clauses 23-27, wherein the first transition roller is a freewheeling roller.

Clause 29. The apparatus of any of clauses 23-28, wherein the second path segment has a first portion and a second portion, wherein at a downstream end of the first portion of the second path segment the back cover sheet passes over a second transition roller to feed the back cover sheet to the second portion of the second path segment and change the direction of movement of the back cover sheet.

Clause 30. The apparatus of any of clause 29, wherein the downstream end of the second path segment is located for depositing the back cover sheet on the second portion of the aqueous gypsum slurry on the front cover sheet to form the multilayer assembly to include the front cover sheet, the first portion of aqueous gypsum slurry layer on the front cover sheet, the second portion of aqueous gypsum slurry layer on the first portion of aqueous gypsum slurry layer, and the back cover sheet on the second portion of aqueous gypsum slurry layer.

Clause 31. An apparatus to manufacture a gypsum board according to the method of any of clauses 1-22, comprising:
a mixer for preparing an aqueous gypsum slurry comprising a mixture of water, and stucco, wherein the stucco comprises calcium sulfate hemihydrate, wherein the aqueous gypsum slurry comprises a mixture of:
at least 60 wt. %, typically 60 to 98 wt. %, preferably at least 70 wt. %, more preferably at least 80 wt. %, typically at least 90 wt. % or typically at least 95 wt. % said calcium sulfate hemihydrate on a dry (water free) basis, and
the water at a weight ratio of water to the calcium sulfate hemihydrate of 0.2:1 to 1.2:1; and
a forming surface for depositing thereon a front cover sheet and moving the front cover sheet horizontally in a machine direction along the forming surface;

a source of a first portion of the aqueous gypsum slurry in an unfoamed state for depositing the first portion of the aqueous gypsum slurry over the front cover sheet to form a layer of the aqueous gypsum slurry as a higher-density region in layer form contacting an upper surface of the front cover sheet,
a back paper drive comprising a first transition roller and a second transition roller for moving a back cover sheet along a back cover sheet path comprising a first path segment and a second path segment,
wherein the first path segment is adapted and configured for moving the back cover sheet along the first path segment above the higher-density region on the front cover sheet with movement comprising a first vertical movement component and/or a first horizontal movement component, wherein the first vertical movement component being movement in a direction downwards towards the higher-density region on the front cover sheet, wherein the first horizontal movement component being movement in a direction opposite to the machine direction,
preferably the back cover sheet moves along a downstream portion of the first path segment with movement along a slope defining an angle "A" between the back cover sheet in the downstream portion of the first path segment and the front cover sheet on the forming surface of 0 to 90 degrees, typically the angle "A" is 0 to 90 degrees, more typically the angle "A" is 5 to 90 degrees or 5 to 85 degrees, more typically the angle "A" is 20 to 60 degrees by having the first vertical movement component and the first horizontal movement component both simultaneously present along all or a same portion of the first segment;
a second portion of the aqueous gypsum slurry, which is less dense than the first portion of the aqueous gypsum slurry, to contact a surface of the back cover sheet in the first path segment, wherein the slurry contacts the back paper at an angle of incidence "B" of 0 to 90 degrees, for example 0 to 20 degrees, preferably 5 to 90 degrees, furthermore preferably 5 to 85 degrees, furthermore preferably 5 to 60 degrees relative to the surface of the back cover sheet contacted by the slurry,
typically the discharge of calcined gypsum core slurry is in a direction of counter current flow with direction of movement of the back cover sheet, or typically the discharge of calcined gypsum core slurry may be in a direction of concurrent flow with the direction of movement of the back cover sheet;
the first transition roller at a downstream end of the first path segment for passing the back cover sheet around the first transition to feed the back cover sheet to the second path segment, wherein the second path segment has an upstream end and a downstream end, wherein the upstream end is at the first transition roller,
preferably the first transition roller changes the direction of movement of the back cover sheet to movement along a first portion of the second path segment that has a second horizontal movement component in the machine direction and a second vertical movement component, the second vertical movement component being upwards, or downwards, or neutral to provide movement only along the second horizontal movement component, typically the second vertical movement component is movement in a direction upwards away from the higher-density region on the front cover sheet;
the first transition roller is spaced a distance above the higher-density region on the front cover sheet for passing the second portion of the aqueous gypsum slurry over the first transition roller to deposit a majority by weight of the second portion of the aqueous gypsum slurry on the higher-density region on the front cover sheet, wherein typically as this deposition occurs a remainder of the second portion of the aqueous gypsum slurry remains in contact with the back cover sheet as the back cover sheet moves into the second path segment, wherein preferably the first transition roller is a free-wheeling roller;

typically the second path segment has a first portion and a second portion, wherein at a downstream end of the first portion of the second path segment the back cover sheet passes over a second transition roller to feed the back cover sheet to the second portion of the second path segment and change the direction of movement of the back cover sheet;

the downstream end of the second path segment located for depositing the back cover sheet on the second portion of the aqueous gypsum slurry on the front cover sheet to form a multilayer assembly including the back cover sheet on the second portion of the aqueous gypsum slurry;

a forming station for forming the multilayer assembly, preferably the forming station comprises a forming plate;

setting the calcium sulfate hemihydrate to form a panel comprising a gypsum core comprising calcium sulfate dihydrate; and wherein the first portion of the gypsum slurry is forms a higher-density region in layer form contacting the front cover sheet;

wherein the second portion of the gypsum slurry is in a foamed state as a lower-density region contacting the higher-density region, the higher-density region having a higher density than the lower-density region; and wherein the board core comprises a set lower-density region comprising calcium sulfate dihydrate and a set higher-density region comprising calcium sulfate dihydrate, the set higher-density region being interposed as a layer between the set lower-density region and the front cover sheet.

Clause 32. A gypsum board made according to the method of any of clauses 1-22.

Clause 33. The gypsum board of clause 32, having a transverse width of 3 to 5 feet, wherein the set higher density region has an average thickness of 20-40 mil measured from the average of a series of 1 inch wide samples taken across the width a transverse cross section of the board, the set higher density region thickness of each sample has a +/−20 mil difference from the average thickness, the minimum set higher density region thickness of the samples is at least 10 mils thickness, and the minimum thickness of the set higher density region of the samples/average thickness=40-100%, typically 40-90 or 40-80%.

The following examples further illustrate the invention but, of course, should not be construed as in any way limiting its scope.

EXAMPLE

Example 1

Figure 9:
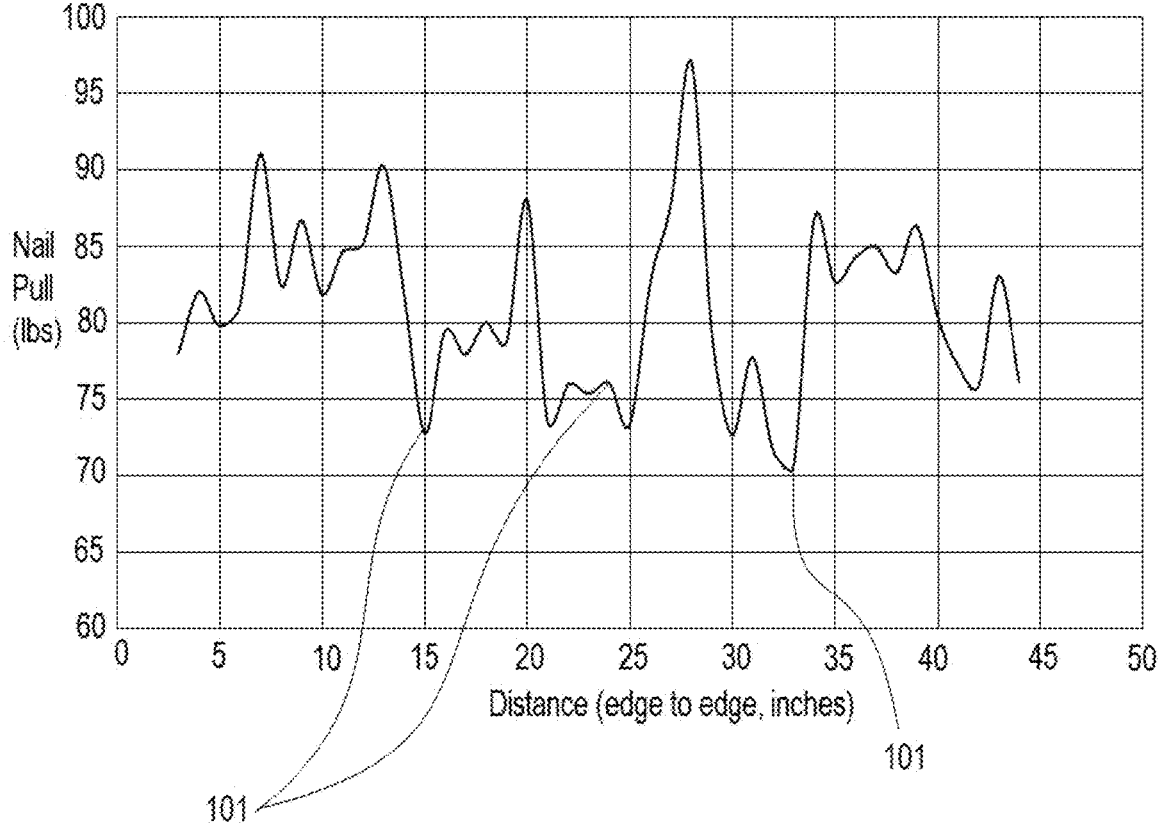
FIG. 9 shows a plot of Nail Pull vs. Distance from Edge for a comparative ½" Gypsum Board showing impact of high velocity slurry from a three legged boot displacing a densified layer slurry.

In a comparative example FIG. 9 shows a plot of Nail Pull vs Distance from Edge for a ½" thick gypsum board showing impact of high velocity slurry from a three legged boot displacing a densified layer slurry.

The lighter core slurry had 30-100 pcf wet density and 20-60 pcf dry density.

The denser slurry had 40-110 pcf wet density and 30-70 pcf dry density.

The unevenness of the resulting densified layer can adversely affect board properties such as nail pull. A formed 0.5" thick wallboard sample is tested for nail pull across its width to obtain the Nail Pull profile for the 0.5" thick and 48" wide board as shown in FIG. 8.

FIG. 9 shows three dips 101 in the plot that respectively result from deposition of the gypsum slurry with a 3-legged boot. The inventors theorize that the dips are from the region of the relatively lower density slurry moving into the strip region of high density—densified layer to displace the densified layer slurry.

Example 2

This example measures average densities of profiles across a gypsum board resulting from gypsum slurry deposited according to the invention for a gypsum layer of about 10-about 40 mils thickness to estimate high density layer thickness. A measured high density implies a high density layer. A measured low density implies a low density core layer. Thus, from measuring the densities and where the measurement changed from a high density to a low density we estimated the thickness of the high density layer.

The gypsum board had a transverse width of 4 feet, wherein the set higher density region had;

an average thickness of 20-40 mil measured from the average of a series of 1 inch wide samples taken across the width a transverse cross section of the board, the set higher density region thickness of each sample had a +/−20 mil difference from the average thickness, and the minimum set higher density region thickness of the samples was at least 10 mils thickness, and the minimum thickness of the set higher density region of the samples/average thickness was 40-100%, typically 40-90 or 40-80%.

For example, the thickness of the set higher density region of each sample was determined by cutting the board vertically across the transverse width of the board into a plurality of samples, for example 48 one inch samples; and slicing each sample in a direction parallel to the front and back surfaces of the board to form a number of horizontal slices of the sample. Then measure the density of each horizontal slice. The horizontal slices having a higher density represent the set higher density region. The horizontal slices having a relatively lower density represent the lower density region. The thickness of the total horizontal slices of a sample having the higher density represented the set higher density region thickness of that sample. The thicknesses of the set higher density region of the samples across the transverse direction of the board and location of each sample across the transverse with of the board are then tabulated and/or plotted to determine the transverse profile of the set higher density region across the board.

The results are presented in TABLE 1 for gypsum boards having a higher density gypsum layer of target thickness of 20-25 mils, except for the Trial of Invention 4 having a target thickness of 35-40 mils. Each Trial is for a separate board. The average in TABLE 1 is an average of samples across the board. TABLE 2 shows minimum and maximum thicknesses of samples across the board.

TABLE 1

Layer thickness (mils) estimated from density profiles and
Layer absolute minimum and maximum layer thicknesses (mils)

| Trial# | Average layer thickness | Stan-dard Devi-ation | Minimum layer thickness of the set higher density region | Maximum layer thickness of the set higher density region | Min. Thickness/ Avg. Thickness expressed as a percentage (%) |
|---|---|---|---|---|---|
| Control 1 | 20.99 | 5.51 | 8.16 | 31.51 | 39 |
| Control 2 | 17.2 | 4.7 | 7.1 | 26.0 | 41 |
| Invention 1 | 20.052 | 5.19 | 8.022 | 32.11 | 40 |
| Invention 2 | 23.14 | 6.24 | 12.95 | 39.04 | 56 |
| Invention 3 | 17.86 | 3.36 | 10.66 | 24.36 | 60 |
| Invention 4* | 35.2 | 13.1 | 14.8 | 63.5 | 42 |
| Invention 5 | 22.7 | 5.6 | 10.9 | 32.6 | 48 |

*Target 35-40 mils

TABLE 1 shows that for a 20-25 mil target thickness the average layer thickness of the invention, but for an outlier Sample 3, is about the same or relatively higher than that of the control. TABLE 1 also shows the minimum layer thickness of the invention is about the same or relatively higher than that of the control. TABLE 1 also shows the minimum thickness of the set higher density region of the samples/average thickness expressed as a percentage is over 40% for the invention Trial samples.

All documents described herein are incorporated by reference herein for purposes of all jurisdictions where such practice is allowed, including any priority documents and/or testing procedures to the extent that they are not inconsistent with this text. As is apparent from the foregoing general description and the specific embodiments, while forms of the disclosure have been illustrated and described, various modifications may be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more of the element that it introduces.

We claim:

1. A method for manufacturing a gypsum board comprising:

depositing a front cover sheet having first and second opposed surfaces over a forming surface, the front cover sheet first surface being a lower surface facing the forming surface and the front cover sheet second surface being an upper surface facing away from the forming surface, and moving the front cover sheet horizontally in a machine direction along the forming surface;

depositing a first portion of aqueous gypsum slurry over the front cover sheet to form a layer of the first portion of aqueous gypsum slurry as a higher-density region in layer form contacting the upper surface of the front cover sheet, moving a back cover sheet having third and fourth opposed surfaces along a back cover sheet path comprising a first path segment and a second path segment downstream of the first path segment, wherein the back cover sheet moves along the first path segment above the higher-density region on the front cover sheet with movement comprising a first vertical movement component and/or a first horizontal movement component, wherein the first vertical movement component being movement in a direction downwards towards the higher-density region on the front cover sheet, wherein the first horizontal movement component being movement in a direction opposite to the machine direction, depositing a second portion of aqueous gypsum slurry, which is less dense than the first portion of aqueous gypsum slurry, to contact the third surface of the back cover sheet in the first path segment, wherein the second portion of aqueous gypsum slurry contacts the back cover sheet at an angle of incidence "B" of 0 to 90 degrees relative to the surface of the back cover sheet contacted by the slurry, wherein the first portion of aqueous gypsum slurry and the second portion of aqueous gypsum slurry each comprise a respective mixture of water and stucco, wherein the stucco comprises calcium sulfate hemihydrate, wherein the first portion of aqueous gypsum slurry and the second portion of aqueous gypsum slurry each comprise a respective mixture of at least 60 wt. % said calcium sulfate hemihydrate on a dry (water free) basis, and the water at a weight ratio of water to the calcium sulfate hemihydrate of 0.2:1 to 1.2:1;

then at a downstream end of the first path segment passing the back cover sheet with the second portion of aqueous gypsum slurry over a first transition roller spaced a distance above the higher-density region on the front cover sheet, while the fourth surface of the back cover sheet contacts the first transition roller, wherein a majority by weight of the second portion of aqueous gypsum slurry drops away from the back cover sheet to deposit on the higher-density region on the front cover sheet, to form a layer of the second portion of aqueous gypsum slurry in a foamed state as a lower-density region in layer form contacting an upper surface of the higher density region, the higher-density region having a higher density than the lower-density region;

the back cover sheet then passes around the first transition roller to feed the back cover sheet to the second path segment, wherein the second path segment has an upstream end and a downstream end, the upstream end at the first transition roller, and at the downstream end of the second path segment depositing the back cover sheet on the second portion of the aqueous gypsum slurry on the face cover sheet to form a multilayer assembly including the back cover sheet on the second portion of the aqueous gypsum slurry;

passing the multilayer assembly into a forming station for forming the multilayer assembly;

setting the calcium sulfate hemihydrate of the respective first portion of aqueous gypsum slurry layer and second portion of aqueous gypsum slurry layer by reacting the calcium sulfate hemihydrate with the water of the respective first portion of aqueous gypsum slurry layer and the second portion of aqueous gypsum slurry layer to form a panel comprising a gypsum core of respective first and second board layers comprising calcium sulfate dihydrate between the front cover sheet and the back cover sheet;

wherein the first board layer comprises a set higher-density region as a layer comprising calcium sulfate dihydrate and has a first board layer density;

wherein the second board layer comprises a set lower-density region as a layer comprising calcium sulfate dihydrate and has a second board layer density lower than the first board layer density, the set higher-density region being interposed between the set lower-density region and the front cover sheet; and drying the panel and cutting the panel into the gypsum board.

2. The method of claim 1, wherein the back cover sheet moves along a downstream portion of the first path segment with movement along a slope defining an angle "A" between the back cover sheet in the downstream portion of the first path segment and the front cover sheet on the forming surface of 0 to 90 degrees.

3. The method of claim 1, wherein the depositing of the second portion of aqueous gypsum slurry is in a direction of counter current flow with direction of movement of the back cover sheet, or the depositing of the second portion of aqueous gypsum slurry is in a direction of concurrent flow with the direction of movement of the back cover sheet.

4. The method of claim 1, wherein the first transition roller changes the direction of movement of the back cover sheet to movement along a first portion of the second path segment that has a second horizontal movement component in the machine direction and a second vertical movement component, the second vertical movement component being upwards, or downwards, or neutral to provide movement only along the second horizontal movement component.

5. The method of claim 1, wherein the first transition roller is a freewheeling roller.

6. The method of claim 1, wherein the second path segment has a first portion and a second portion, wherein at a downstream end of the first portion of the second path segment the back cover sheet passes over a second transition roller to feed the back cover sheet to the second portion of the second path segment and change the direction of movement of the back cover sheet.

7. The method of claim 1, wherein at the downstream end of the second path segment the multilayer assembly includes the first portion of aqueous gypsum slurry layer on the front cover sheet, the second portion of aqueous gypsum slurry layer on the first portion of aqueous gypsum slurry layer, and the back cover sheet on the second portion of aqueous gypsum slurry layer.

8. The method of claim 1, wherein the forming of the layer of the aqueous gypsum slurry as a higher-density region in layer form contacting an upper surface of the front cover sheet comprises passing the front cover sheet under a slurry roller to spread the slurry of the higher-density region.

9. The method of claim 1, wherein the depositing of the second portion of aqueous gypsum slurry is in a direction of concurrent flow with the direction of movement of the back cover sheet.

10. The method of claim 1, the depositing of the second portion of aqueous gypsum slurry is in a direction of counter current flow with the direction of movement of the back cover sheet.

11. The method of claim 1, wherein the slurry mixer deposits the second portion of aqueous gypsum slurry onto a portion of the back-cover sheet supported by a back-plate.

12. The method of claim 6, wherein the second transition roller is a freewheeling roller or a driven roller.

13. The method of claim 6, wherein the second transition roller is a bare-center shaft roller having a central shaft of a first diameter and opposed cylindrical end portions of a second diameter, wherein the second diameter is larger than the first diameter.

14. The method of claim 6, wherein the second transition roller is at a sufficiently raised position relative to the front cover sheet moving along the forming surface for a head of aqueous gypsum slurry at the downstream end of the second path segment to be visible to an operator.

15. The method of claim 1, wherein the front cover sheet comprises at least one of a glass mat facer sheet or a paper facer sheet.

16. The method of claim 1, wherein the lower-density region resulting from the set gypsum lower-density region slurry has a thickness of 0.25 inches to 1.5 inches;

wherein the higher-density region has a thickness of about 0.02 inches to about 0.75 inches;

wherein the lower-density region has a density of 15 to 55 pounds/cubic foot, and wherein the higher-density region has a density of 25 to 70 pounds/cubic foot.

* * * * *